United States Patent
Li et al.

(10) Patent No.: US 12,273,815 B2
(45) Date of Patent: Apr. 8, 2025

(54) WAKE-UP OR GO-TO-SLEEP SIGNALING FOR MULTIPLE SIDELINK DISCONTINUOUS RECEPTION CYCLES

(71) Applicant: QUALCOMM Incorporated, San Diego, CA (US)

(72) Inventors: Qing Li, Princeton Junction, NJ (US); Junyi Li, Fairless Hills, PA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/553,048

(22) Filed: Dec. 16, 2021

(65) Prior Publication Data

US 2023/0199656 A1   Jun. 22, 2023

(51) Int. Cl.
*H04W 52/02* (2009.01)
*H04W 92/18* (2009.01)

(52) U.S. Cl.
CPC ... *H04W 52/0232* (2013.01); *H04W 52/0216* (2013.01); *H04W 52/0235* (2013.01); *H04W 92/18* (2013.01)

(58) Field of Classification Search
CPC ......... H04W 52/0232; H04W 52/0216; H04W 52/0235; H04W 52/0229; H04W 92/18; Y02D 30/70
See application file for complete search history.

(56) References Cited

U.S. PATENT DOCUMENTS

| | | | |
|---|---|---|---|
| 2022/0346081 A1* | 10/2022 | Luo | H04W 52/0235 |
| 2022/0353815 A1* | 11/2022 | Lin | H04W 52/0232 |
| 2023/0063472 A1* | 3/2023 | Freda | H04W 76/28 |
| 2023/0164873 A1* | 5/2023 | Hahn | H04W 52/0216 370/328 |
| 2023/0189388 A1* | 6/2023 | Yu | H04W 52/0216 370/329 |
| 2023/0247557 A1* | 8/2023 | Zhao | H04W 52/02 370/311 |
| 2024/0172116 A1* | 5/2024 | Jiao | H04W 52/0238 |

FOREIGN PATENT DOCUMENTS

WO   WO-2022060118 A1 *   3/2022

* cited by examiner

*Primary Examiner* — Robert C Scheibel
(74) *Attorney, Agent, or Firm* — Kevin M. Donnelly; Holland & Hart LLP

(57) ABSTRACT

Methods, systems, and devices for wireless communications are described. A transmitting user equipments (UEs) may transmit a sidelink indication signal including a sequence (for example, wakeup signal or go-to-sleep signal) for a receiving UE to determine whether to monitor for scheduling sidelink control information (SCI) messages in one or more sidelink discontinuous reception (DRX) on durations that overlap in time. The receiving UE may determine (for example, based on an initial value in the sequence, the resource on which the sequence was received, among other examples) a location of an on duration, and may perform a DRX operation (for example, may wake up or may go to sleep) during the on duration.

30 Claims, 16 Drawing Sheets

WAKE-UP OR GO-TO-SLEEP SIGNALING FOR MULTIPLE SIDELINK DISCONTINUOUS RECEPTION CYCLES

TECHNICAL FIELD

The following relates to wireless communications, including wake-up or go-to-sleep signaling for multiple sidelink discontinuous reception cycles.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, UEs may communicate with each other via sidelink channels. To conserve power, a UE may operate according to one or more discontinuous reception (DRX) cycles. When operating according to a DRX cycle, a UE may wake up during a configured on duration of the DRX cycle to receive signaling, and may go to sleep to conserve power during off durations of the DRX cycle. Different DRX cycles may be configured for different types of sidelink communications (for example, for different cast types). For cases in which the UE is configured with multiple DRX cycles, the UE may wake up during each configured DRX cycle, consuming power unnecessarily. If a UE can determine that there is no signaling to be received during an on duration of a DRX cycle, then the UE may conserve power by remaining in a sleep mode during the on duration. In some cases, a transmitting device, such as another sidelink UE, may transmit a wakeup signal (WUS) before an on duration and instruct a UE to wake up during the on duration. If no WUS is received by the UE, then the UE may not wake up for the on duration. Additionally, or alternatively, different sidelink UEs associated with respective DRX cycles with respective on durations that overlap in time may each transmit a respective WUS instructing the UE to wake up during the respective on durations. The UE, however, may not be able to determine which WUS corresponds to which DRX cycle, among other issues.

SUMMARY

The systems, methods and deices of this disclosure each have several innovative aspects, no single one of which is solely responsible for the desirable attributes disclosed herein.

One innovative aspect of the subject matter described in this disclosure can be implemented in a method for wireless communication at a first user equipment (UE). The method includes receiving, from a second UE, a sidelink signal including a sequence indicating to the first UE to change an active status for at least a portion of a first on duration of a first discontinuous reception cycle of a plurality of discontinuous reception cycles, the first on duration at least partially overlapping in time with one or more other on durations of one or more other discontinuous reception cycles of the plurality of discontinuous reception cycles, and performing a discontinuous reception procedure during the first on duration based on the sequence indicating to the first UE to change the active status.

Another innovative aspect of the subject matter described in this disclosure can be implemented in an apparatus for wireless communications at a first UE. The apparatus may include a processor, memory coupled with the processor, and instructions stored in the memory. The instructions may be executable by the processor to cause the apparatus to receive, from a second UE, a sidelink signal including a sequence indicating to the first UE to change an active status for at least a portion of a first on duration of a first discontinuous reception cycle of a plurality of discontinuous reception cycles, the first on duration at least partially overlapping in time with one or more other on durations of one or more other discontinuous reception cycles of the plurality of discontinuous reception cycles, and perform a discontinuous reception procedure during the first on duration based on the sequence indicating to the first UE to change the active status.

Another innovative aspect of the subject matter described in this disclosure can be implemented in an apparatus for wireless communications at a first UE. The apparatus may include means for receiving, from a second UE, a sidelink signal including a sequence indicating to the first UE to change an active status for at least a portion of a first on duration of a first discontinuous reception cycle of a plurality of discontinuous reception cycles, the first on duration at least partially overlapping in time with one or more other on durations of one or more other discontinuous reception cycles of the plurality of discontinuous reception cycles, and means for performing a discontinuous reception procedure during the first on duration based on the sequence indicating to the first UE to change the active status.

Another innovative aspect of the subject matter described in this disclosure can be implemented in a non-transitory computer-readable medium storing code for wireless communications at a first UE. The code may include instructions executable by a processor to receive, from a second UE, a sidelink signal including a sequence indicating to the first UE to change an active status for at least a portion of a first on duration of a first discontinuous reception cycle of a plurality of discontinuous reception cycles, the first on duration at least partially overlapping in time with one or more other on durations of one or more other discontinuous reception cycles of the plurality of discontinuous reception cycles, and perform a discontinuous reception procedure during the first on duration based on the sequence indicating to the first UE to change the active status.

Another innovative aspect of the subject matter described in this disclosure can be implemented in a method of wireless communications at a second UE. The method includes generating a sidelink signal including a sequence indicating to a first UE to change an active status during an on duration of a discontinuous reception cycle, transmitting the sidelink signal including the sequence to the first UE on a first sidelink resource, and communicate with the first UE based on transmitting the sidelink signal including the sequence.

Another innovative aspect of the subject matter described in this disclosure can be implemented in an apparatus for wireless communications at a second UE. The apparatus may include a processor, memory coupled with the processor, and instructions stored in the memory. The instructions may be executable by the processor to cause the apparatus to generate a sidelink signal including a sequence indicating to a first UE to change an active status during an on duration of a discontinuous reception cycle, transmit the sidelink signal including the sequence to the first UE on a first sidelink resource, and communicate with the first UE based on transmitting the sidelink signal including the sequence.

Another innovative aspect of the subject matter described in this disclosure can be implemented in an apparatus for wireless communications at a second UE. The apparatus may include means for generating a sidelink signal including a sequence indicating to a first UE to change an active status during an on duration of a discontinuous reception cycle, means for transmitting the sidelink signal including the sequence to the first UE on a first sidelink resource, and means for communicate with the first UE based on transmitting the sidelink signal including the sequence.

Another innovative aspect of the subject matter described in this disclosure can be implemented in a non-transitory computer-readable medium storing code for wireless communications at a second UE. The code may include instructions executable by a processor to generate a sidelink signal including a sequence indicating to a first UE to change an active status during an on duration of a discontinuous reception cycle, transmit the sidelink signal including the sequence to the first UE on a first sidelink resource, and communicate with the first UE based on transmitting the sidelink signal including the sequence.

DETAILED DESCRIPTION

Figure 1:
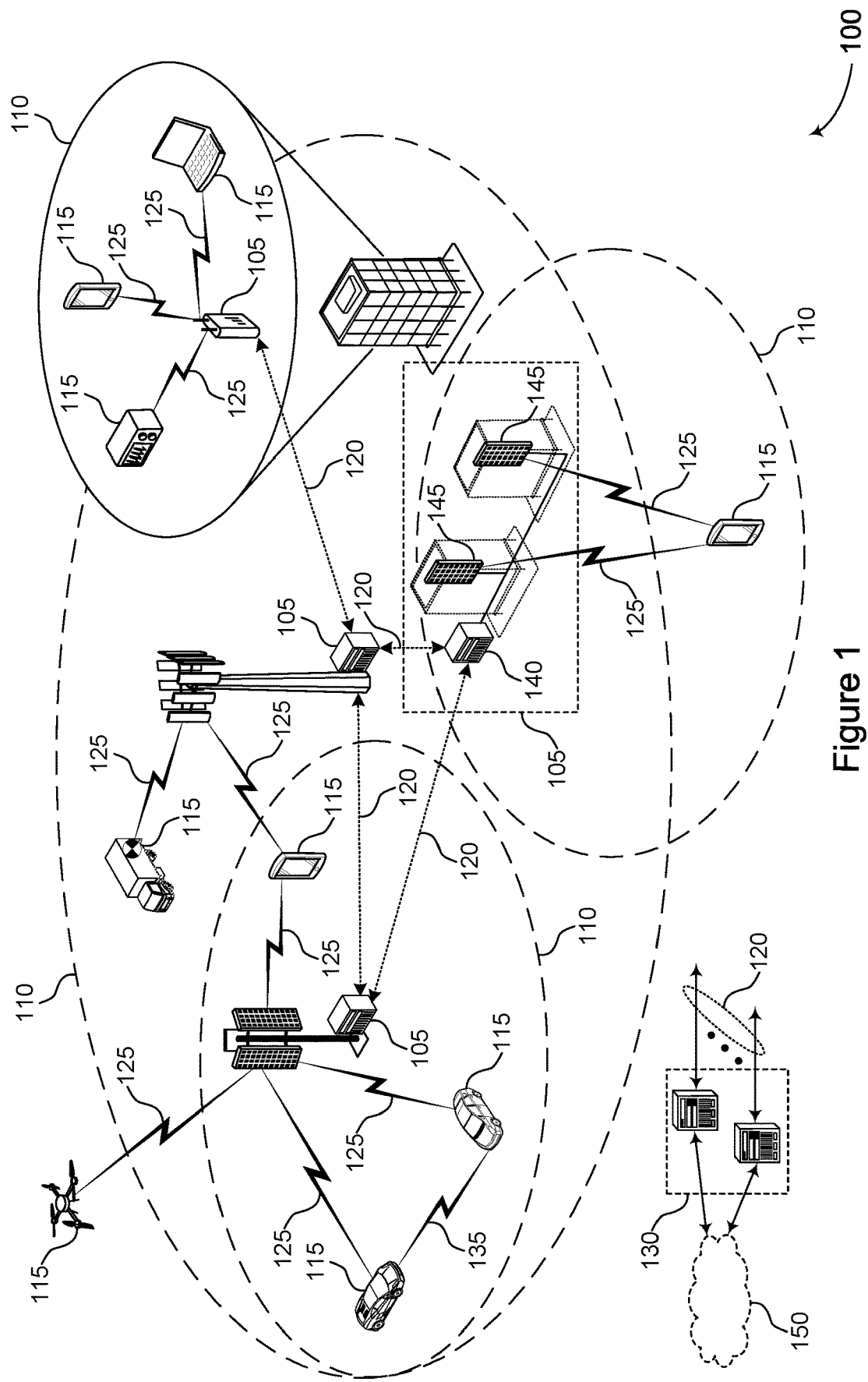
FIG. 1 illustrates an example of a wireless communications system that supports wake-up or go-to-sleep signaling for multiple sidelink discontinuous reception cycles in accordance with aspects of the present disclosure.

Various user equipments (UEs) may communicate with each other via sidelink channels. To conserve power, the UEs may go to sleep and wake up at various times (for example, periodically), according to on durations and off durations of different discontinuous reception (DRX) cycles, which may be for different types of communication services. In some examples (for example, 5G deployments), DRX cycles and procedures may be applied to sidelink signaling. In such examples, during each on duration of a sidelink DRX cycle configured at a UE, the UE may receive control signaling, for example, which may include sidelink control information (SCI), scheduling sidelink resources for sidelink data transmissions. If the UE is configured for unicast signaling, it may be the only UE that monitors for the SCI during the on duration. If the UE is configured for groupcast or broadcast signaling, then one or more UEs, including the UE, may monitor for the SCI during the on duration. In some cases, the UE may wake up to monitor for a scheduling SCI during each on duration of each respective DRX cycle regardless of whether there is a pending sidelink data transmission for the UE. Further, in cases in which a UE is configured for multiple sidelink DRX cycles (for example, for multiple types of sidelink communications), the UE may wake up even more often so that the UE can monitor for scheduling SCI during the on durations associated with the multiple sidelink DRX cycles regardless of whether there is a pending sidelink transmission for the UE. This may result in unnecessary power consumption by the UE.

In some cases, to efficiently enable the use of DRX cycles in sidelink communications, a transmitting UE may indicate, to a receiving UE, whether the transmitting UE has data to transmit over a sidelink channel to the receiving UE. If the receiving UE can determine that there is no signaling to be received during an on duration of a particular DRX cycle, then the receiving UE may conserve power by remaining in a sleep mode during the on duration. In some examples, the transmitting UE may transmit a wakeup signal (WUS) prior to a next on duration of a particular DRX cycle instructing the receiving UE to wake up during the next on duration. In such examples, if the receiving UE does not receive a WUS prior to the next on duration, the UE may not wake up for the on duration. But multiple transmitting UEs may transmit WUSs prior to respective on durations for multiple respective DRX cycles, at least some of which may overlap in time (for example, may start at a same time or at least partially overlap in time). In such examples, the receiving UE may not be able to determine which WUSs are associated with which respective on duration of the multiple respective DRX cycles, which may lead to confusion for each receiving UE regarding which on durations each receiving UE is to wake up and monitor for, for example, scheduling SCI.

Various aspects generally relate to sidelink communications, and more specifically to a sidelink indication signal including a sequence to change an active state of a UE (for example, signaling indicating to the UE to wake up or to go to sleep) for on durations of respective sidelink DRX cycles. In some examples, each of multiple transmitting UEs may send a sidelink indication signal including a sequence that includes, for example, a wakeup signal indicating to one or more respective receiving UEs to wake up (for example, enter an active state or a high power state) or a go-to-sleep signal indicating to one or more respective receiving UEs to go to or remain asleep (for example, enter or remain in an inactive state or a low power state). Each receiving UE may determine whether to monitor for scheduling SCI in subsequent on durations of one or multiple sidelink DRX cycles based on the sidelink indication signals. In some examples, each transmitting UE may indicate whether each receiving UE is to change a wakeup status based on transmitting or refraining from transmitting a sidelink indication signal. In some such examples, each transmitting UE may transmit a sidelink indication signal including a sequence to one or more receiving UEs that indicates to the receiving UEs to wake up in a subsequent on duration in instances in which the transmitting UE has sidelink data to transmit in the subsequent on duration. In some other such examples, the transmitting UE may refrain from sending the sidelink indication signal that includes the sequence in instances in which the receiving UE is to stay asleep or otherwise not wake up for the subsequent on duration (for example, because the transmitting UE does not have sidelink data to transmit to the receiving UE in the subsequent on duration). In some examples, each transmitting UE may indicate whether a receiving UE is to change a wakeup status based on the contents of a sidelink indication signal or the resources on which each transmitting UE transmits a sidelink indication signal. In some such examples, each transmitting UE may transmit a sidelink indication signal including a sequence that explicitly indicates to a receiving UE to wake up or to go to sleep or remain asleep for the subsequent on duration (for example, via a 1-bit indication in the sequence or via a resource on which the sequence is transmitted).

In some examples, when the transmitting UE transmits a sequence indicating to a receiving UE to wake up for a subsequent on duration, the transmitting UE may further indicate, based on which sidelink resource the transmitting UE uses to transmit the sidelink indication signal including the sequence or based on an initial value for the sequence itself, a particular DRX cycle associated with the particular on duration that the receiving UE is to monitor for SCI. In some such examples, the transmitting UE may transmit the sequence (indicating to the receiving UE to wake up for the subsequent on duration) in a first stage indication, and may transmit additional information in a second stage indication (such as a source identifier, a destination identifier, or a number of cycles for the UE to wake up for or go to sleep in, among other possibilities).

Particular aspects of the subject matter described in this disclosure may be implemented to realize one or more of the following potential advances. The techniques employed by the described communication devices may provide benefits and enhancements to sidelink communications including by reducing excessive power consumption by a UE that would otherwise wake up for every on duration of every DRX cycle for which the UE is configured regardless of whether there is data to be transmitted in the on durations. Techniques described herein reduce such unnecessary power consumption by supporting a sidelink indication signal including a sequence that efficiently indicates to the UE whether to wake up or go to sleep for one or more subsequent on durations of a DRX cycle. Further, such techniques can be performed with low overhead by using small signals or indications (for example, a 1-bit indicator in a sequence), or based on a resource allocation that efficiently conveys specific meanings as described herein. In some implementations, techniques described herein also support transmission of multiple sidelink indication signals including respective sequences (for example, wake-up signals or a go-to-sleep signals) by multiple transmitting UEs such that each receiving UE may determine for which on duration a given wake-up signal or go-to-sleep signal is associated. Such sidelink indication signals may enable power savings resulting from the use of multiple DRX cycles and improved reliability of communications, without an increase in failed signaling or retransmissions at each receiving UE.

Aspects of the disclosure are initially described in the context of wireless communications systems. Aspects of the disclosure are further illustrated by and described with reference to wireless communications systems, timelines, and process flows. Aspects of the disclosure are further illustrated by and described with reference to apparatus diagrams, system diagrams, and flowcharts that relate to wake-up or go-to-sleep signaling for multiple sidelink discontinuous reception cycles.

FIG. 1 illustrates an example of a wireless communications system 100 that supports wake-up or go-to-sleep signaling for multiple sidelink discontinuous reception cycles in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB- IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a transmitting UE 115 may transmit a sidelink indication signal including a sequence (for example, wakeup signal or go-to-sleep signal) for a receiving UE 115 to determine whether to monitor scheduling sidelink control information (SCI) in one or more sidelink discontinuous reception (DRX) on durations. The receiving UE 115 may determine (for example, based on an initial value in the sequence, the resource on which the sequence was received, among other examples) an on duration, during which to wake up or go to sleep.

Figure 2:
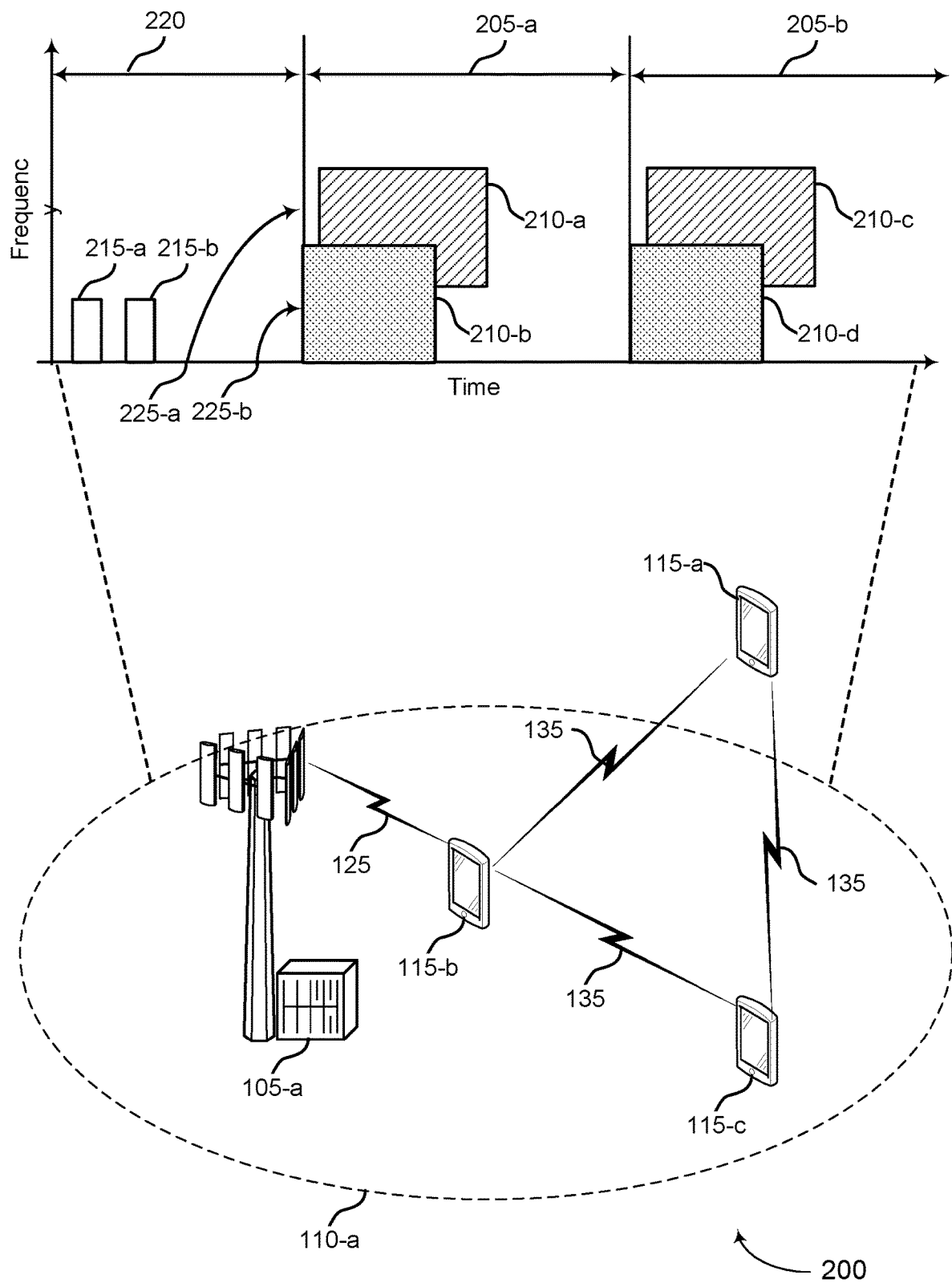
FIG. 2 illustrates an example of a wireless communications system that supports wake-up or go-to-sleep signaling for multiple sidelink discontinuous reception cycles in accordance with aspects of the present disclosure.

FIG. 2 illustrates an example of a wireless communications system 200 that supports wake-up or go-to-sleep signaling for multiple sidelink discontinuous reception cycles in accordance with aspects of the present disclosure. The wireless communications system 200 may include a base station 105-a, and one or more UEs 115 (for example, the UE 115-a, the UE 115-b, and the UE 115-c). In some examples, the base station 105-a may communicate with one or more UEs 115 in a coverage area 110-a (for example, the UE 115-ab and the UE 115c) via a wireless communications link 125 (for example, a Uu interface). The UEs 115 may communicate with each other via wireless communication links 135 (for example, a PC-5 interface). The UEs 115 may communicate with each other (for example, using the wireless communication links 135) on sidelink resources.

The UEs 115 may communicate with each other according to sidelink discontinuous reception (DRX) cycles. In such examples, a receiving UE 115-a may go to sleep for a time period, and then wake up during a time period (for example, an on duration) to monitor sidelink control signals.

The sidelink control information (SCI) may schedule sidelink resources for a sidelink data transmission. Thus, the receiving UE 115-a may wake up and monitor scheduling SCI to determine if there is a sidelink packet transmitted to the receiving UE 115-a.

In some examples, a receiving UE 115-a may communicate with one or more UEs 115 according to different types of wireless communications (for example, different cast types) for different services. The UE 115-a may receive a unicast message (for example, from the UE 115-b), or a groupcast message (for example, from the UE 115-c to a group of UEs 115 including the UE 115-a), a broadcast message (for example, from another UE 115 or from the UE 115-c), or a combination thereof. The receiving UE 115-a may participate in such different types of sidelink communications, and may be configured with multiple sidelink DRX cycles (for example, a sidelink DRX cycle for each type of wireless communications). In examples in which the receiving UE 115-a is configured with multiple sidelink DRX cycles, the UE 115-a may wake up (for example, power on to monitor for scheduling SCI) for each sidelink on duration (for example, of multiple respective sidelink DRX cycles). The receiving UE 115-a may wake up for each of multiple on durations, whether there is any sidelink data packet available for transmission to the UE 115-a or not. This may result in unnecessary power consumption in examples in which there is no traffic within one or more on durations of multiple respective sidelink DRX cycles.

In some examples, one or more UEs 115 may transmit a sidelink signal, such as a wakeup signal (WUS) 225, to the UE 115-a. A WUS 225 may indicate that the transmitting UE 115 has sidelink data to transmit to the UE 115-a during one or more forthcoming on durations 210. Thus, the UE 115-a may wake up (for example, may enter an awake state, or a partially awake state) to monitor for a WUS 225. In examples in which the WUS 225 indicates that a transmitting UE 115 has sidelink data to transmit to the UE 115-a, then the UE 115-a may wake up for one or more on durations 210 associated with the transmitting UE 115. For instance, the UE 115-b may have a packet 215-a (for example, received from higher layers for the UE 115-b to transmit during sidelink on duration 210-a or sidelink on duration 210-c of a first sidelink DRX cycle for a first communication). Similarly, the UE 115-c may have a packet 215-b (for example, received from higher layers from the UE 115-c to transmit during sidelink on duration 210-b or sidelink on duration 210-d of a second sidelink DRX cycle for a second communication). Sidelink on durations 210 may occur within one or more sidelink DRX cycles (for example, sidelink DRX cycles having a period 205, in which on durations 210 occur in period 205-a and in period 205-b), which may be defined by a sidelink DRX offset 220 with reference to a system time reference point. In some examples, the transmitting UEs 115 may prepare transmissions of sidelink packets 215 during different sidelink DRX cycles. For instance, the UE 115-b may transmit the sidelink packet 215-a for unicast transmission to the receiving UE 115-a during an on duration 210 (for example, the on duration 210-a or the on duration 210-c of the first sidelink DRX cycle for unicast transmissions), and the UE 115-c may transmit a sidelink packet 215-b for groupcast transmission to a group of UEs 115 including the UE 115-a during an on duration 210 (for example, the on duration 210-b or the on duration 210-d of the second sidelink DRX cycle for groupcast transmissions).

In some examples, one or multiple transmitting UEs 115 (for example, the UE 115-b and the UE 115-c) may transmit WUSs 225 to the other UEs 115. The WUSs 225 may indicate that the UE 115-a is to monitor one or multiple subsequent sidelink on durations 210, for respective DRX cycles, for one or more services using broadcasts, groups using groupcasts, or UE pairs using unicast. For instance, the UE 115-b may transmit the WUS 225-a, indicating that the UE 115-a is to monitor for SCI scheduling sidelink data transmissions during the on duration 210-a (for example, of the first sidelink DRX cycle). The UE 115-c may also transmit the WUS 225-b, indicating that the UE 115-a is to monitor for SCI scheduling sidelink data transmissions during the on duration 210-b (for example, of the second sidelink DRX cycle). However, some on durations 210 may overlap (for instance, may start at the same or different time, may overlap at least partially in time resources, frequency resources, or both). In such examples, the UE 115-a may benefit from determining both that the UE 115-a is to wake up to monitor for SCI, but also which on duration (for example, which time resources, frequency resources, or both) to monitor for sidelink data transmissions. In examples in which the UE 115-a receives both the WUS 225-a and the WUS 225-b, and in examples in which both the WUSs 225 indicate that the UE 115-a is to wake up for a forthcoming on duration 210, the UE 115-a may erroneously wake up for a wrong on duration 210, or may fail to wake up at a triggered on duration 210. For instance, the UE 115-b may transmit the WUS 225-a to the UE 115-a, instructing the UE 115-a to wake up and monitor a forthcoming on duration 210 for one or more sidelink packets from the UE 115-b. However, because the on duration 210-a and the on duration 210-b overlap (for example, start at the same time), the UE 115-a may erroneously monitor sidelink resources (for example, time resources, frequency resources, spatial resources, among other examples). In such example, the UE 115-a may not successfully receive the sidelink packet 215-a (for example, because the UE 115-a is monitoring sidelink resources during the on duration 210-b instead of the resources of the on duration 210-a). This may result in failed reception, increased retransmissions, increased system latency, decreased reliability of sidelink communications, and decreased user experience.

Techniques described herein may support an indication signal from one or more transmitting UEs 115 (for example, the transmitting UE 115-b and the transmitting UE 115-c) to one or more receiving UEs 115-a for instructing the UE 115-a to wake up, or go to sleep, during one or more forthcoming on durations 210. For multiple on durations 210 that overlap, transmission of sequences may support detection of WUSs 225 by the UE 115-a among multiple WUSs 225 for multiple sidelink DRX cycles. For example, a transmitting UE 115 providing broadcast services, multicast or groupcast services, unicast services, among other examples, may transmit a packet to other UEs 115 on a sidelink. One or more transmitting UEs 115 may transmit wake-up signals or go-to-sleep signals for respective receiving UEs 115. A receiving UE 115 may determine whether to monitor for a scheduling SCI within one or more on durations 210 of different sidelink DRX cycles (for example, especially where multiple sidelink on durations 210 of different DRX cycles overlap in time) based on the received wakeup signals or go-to-sleep signals.

In some examples, as described in greater detail with reference to FIGS. 3-4, a transmitting UE 115 may transmit a WUS 225 in examples in which the transmitting UE 115 has one or more pending sidelink packets to transmit to one or more receiving UEs 115-a (for example, and may refrain from transmitting a WUS 225 in examples in which the transmitting UE 115 does not have any sidelink packet to transmit to the one or more receiving UEs 115-*a*). The WUS 225 may include a sequence instructing the receiving UEs 115-*a* to wake up (for example, a 1-bit indication). The transmitting UE 115 may transmit the WUS 225 on a resource associated with a destination identifier (for example, a layer 1 (L1) or layer 2 (L2) destination ID for a communication) associated with the on duration 210 in which the receiving UE 115-*a* is to wake up and monitor for the sidelink packets, as illustrated with reference to FIG. 3. The transmitting UE 115 may generate a sequence based on a destination identifier, for example, using an initial value associated with an L1 or L2 destination identifier for a communication, based on which the receiving UE 115-*a* may determine the on duration 210 associated with the L1 or L2 destination ID detected from the received sequence and may wake up and monitor for the one or more sidelink packets during this on duration 210, as illustrated with reference to FIG. 4.

In some examples, as described in greater detail with reference to FIG. 5, the transmitting UE 115 may transmit a two-stage wake-up indication in examples in which the transmitting UE 115 has one or more pending sidelink packets to transmit to the one or more receiving UEs 115-*a* (for example, and may refrain from transmitting a WUS 225 in examples in which the transmitting UE 115 does not have any sidelink packet to transmit to the receiving one or more UEs 115-*a*). In such examples, a first stage indication may include a sequence (for example, a 1-bit sequence) indicating that the one or more receiving UEs 115-*a* are to wake up and monitor for sidelink packets from the transmitting UE 115. For example, the receiving UE 115-*a* may wake up during a forthcoming on duration, and may receive additional information in a second stage wake-up indication. The second stage wake-up indication may be carried on a MAC-CE, and may include an L2 source identifier associated with the transmitting UE 115, an L2 destination ID associated with the on duration in which the UE 115-*a* is to receive the one or more sidelink packets from the transmitting UE 115, a number of on durations of the sidelink DRX cycle or a number of sidelink DRX cycles at which the receiving UE 115-*a* is to wake up and receive one or more sidelink packets from the transmitting UE 115, or other additional information such as communication range, the location of the transmitting UE 115, among other examples, based on which the receiving one or more UEs 115-*a* may determine to ignore a received two-stage wake-up indication. For example, the one or more UEs 115-*a* may determine to ignore a received two-stage wake-up indication if the distance from the transmitting UE 115 is larger than the communication range, among other examples.

In some examples, as described in greater detail with reference to FIG. 6, the transmitting UE 115 may transmit a sequence-based indication instructing the one or more receiving UEs 115-*a* to wake up or to go to sleep. For example, the sequence may include a 1-bit indication, which may indicate either that the one or more receiving UEs 115-*a* are to wake up (for example, in examples in which the 1-bit indication is set to "1"), or that the one or more receiving UEs 115-*a* are to go to sleep (for example, in examples in which the 1-bit indication is set to "0"). In some examples, the transmitting UE 115 may transmit the sequence at a first resource to indicate that the UE 115-*a* is to wake up, or at a second resources in examples in which the UE 115-*a* is to go to sleep. The resource, the sequence, or both, may indicate an L1 or L2 destination identifier associated with the on duration during which the one or more UEs 115-*a* are to wake up and receive the sidelink packet(s).

In some examples, as described in greater detail with reference to FIG. 7, the transmitting UE 115 may transmit a two-stage wake-up indication or a two-stage go-to-sleep indication. In such examples, a first stage indication signal may include a sequence (for example, a 1-bit sequence) indicating that the one or more receiving UEs 115-*a* are to wake up and monitor for one or more sidelink packets from the transmitting UE 115 (for example, in examples in which the bit is set to "1"), or that the one or more receiving UEs 115-*a* are to go to sleep and refrain from monitoring for one or more sidelink packets from the transmitting UE 115. The one or more receiving UEs 115-*a* may wake up during a forthcoming on duration, and may receive additional information in a second stage indication. For example, the second stage indication may be carried on a MAC-CE, and may include an L2 source identifier associated with the transmitting UE 115, an L2 destination ID associated with the on duration in which the one or more receiving UEs 115-*a* are to receive the sidelink packets from the transmitting UE 115, a number of on durations of the sidelink DRX cycle or a number of sidelink DRX cycles at which the one or more receiving UEs 115-*a* are to wake up and receive one or more sidelink packets from the transmitting UE 115, or other additional information such as communication range, or a location of the transmitting UE 115, based on which the one or more receiving UEs 115-*a* may determine whether to ignore a received two-stage wake-up indication, among other examples. The one or more receiving UEs 115-*a* may determine whether to remain awake for the rest of the on duration or one or more additional on durations or both, or to go back to sleep for a remainder of the on duration or one or more additional on durations, based on the second stage indication.

Figure 3:
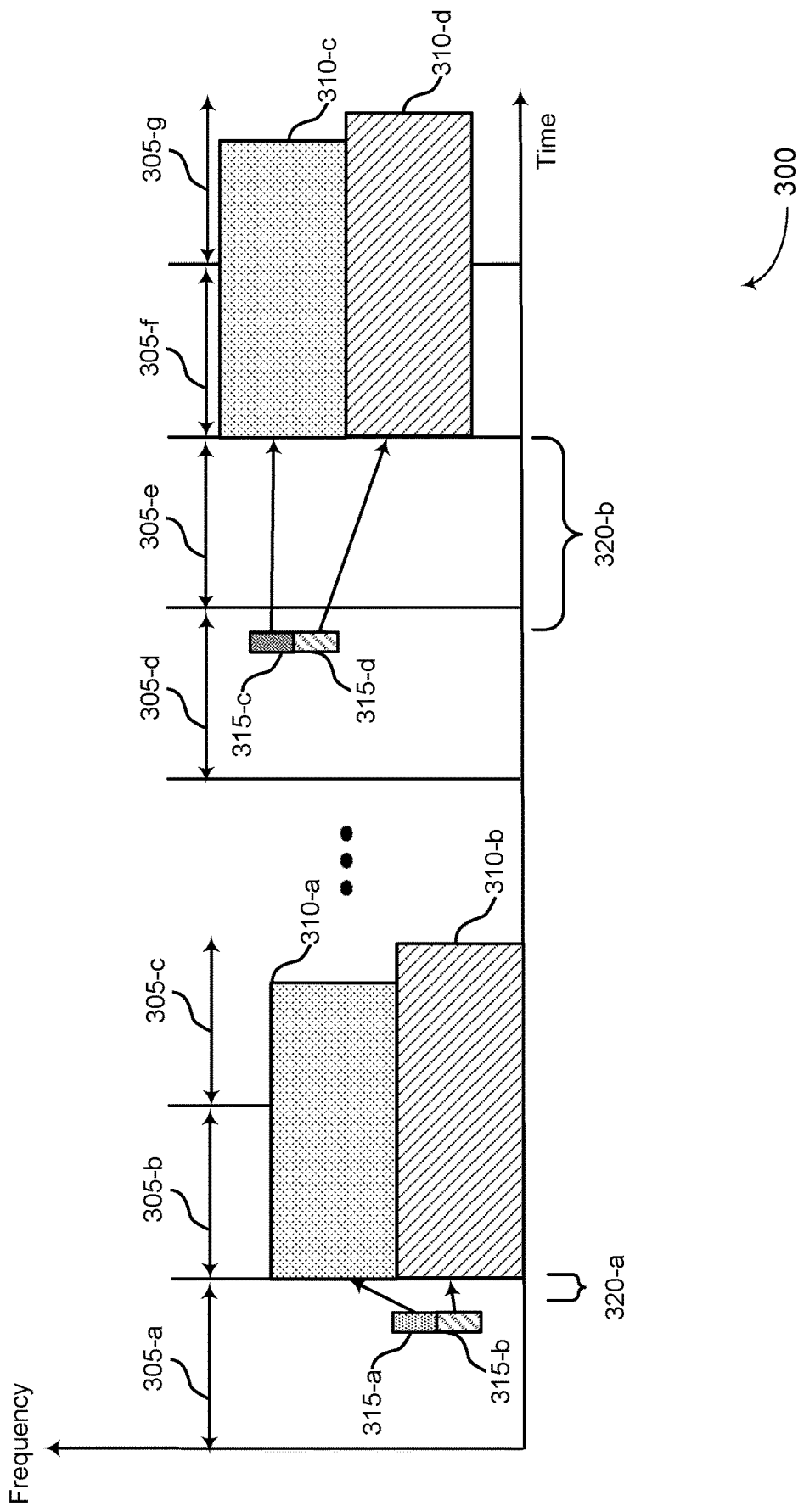
FIG. 3 illustrates an example of a timeline that supports wake-up or go-to-sleep signaling for multiple sidelink discontinuous reception cycles in accordance with aspects of the present disclosure.

FIG. 3 illustrates an example of a timeline 300 that supports wake-up or go-to-sleep signaling for multiple sidelink discontinuous reception cycles in accordance with aspects of the present disclosure. Timeline 300 may be implemented by, or may implement aspects of, wireless communications system 100, or wireless communications system 200. For example, one or more UEs 115, which may be examples of corresponding devices described with reference to FIGS. 1-2, may perform techniques described with reference to FIG. 3.

Different transmitting UEs 115 may transmit one or more sidelink indication signals, including a sequence indicating to at least a receiving UE (for example, the one or more receiving UEs 115-*a* described with reference to FIG. 2) to change an active status during a sidelink DRX cycle. The transmitting UE (for example, the UE 115-*b* described with reference to FIG. 2) may transmit the sidelink indication signal in examples in which the UE 115-*b* has one or more sidelink packets (for example, sidelink control information and data) to transmit to the one or more receiving UEs 115-*a* during a forthcoming on duration 310. The UE 115-*b* may refrain from transmitting the sidelink indication signal in examples in which the UE 115-*b* does not have a sidelink packet to transmit to the one or more receiving UEs 115-*a* during the forthcoming on duration 310. The sequence included in the sidelink indication signal may be a sequence conveying one or more bits for an indication. In some examples, the sequence may be designed and transmitted such that a cyclic shift of the sequence is orthogonal to itself. The sequence may be, for instance, a Zadoff-Chu (ZC) sequence. The sequence may contain a 1-bit indication mapped to a cyclic shift value, wherein the 1-bit indication may indicate to the UE 115-a to change an active status (for example, a 1-bit indication value of "1" to wake up) during a forthcoming sidelink DRX on duration.

The sequence with a cyclic shift α of a base sequence $\bar{s}_{u,v}(n)$ may be exemplified according to Equation 1:

$$s_{u,v}^{\alpha}(n) = e^{j\alpha n}\bar{s}_{u,v}(n), \ 0 \leq n < N_{ZC}$$

where $N_{ZC}$ represents the ZC sequence length, u represents the group number, u represents the base sequence number within a group. The base sequence $\bar{s}_{u,v}(0), \ldots, \bar{s}_{u,v}(N_{ZC}-1)$ may depend on the sequence length $N_{ZC}$, for example, using one PRB. The sequence group u and the sequence number v may depend on the sequence hopping which may be enabled or disabled by specification or pre-configuration or configuration. The cyclic shift α may be defined as a function according to Equation 2:

$$a_l = \frac{2\pi}{N_{sc}}\left((m_0 + m_{ind} + f(c(n_{slot}, l))) \bmod N_{sc}\right) \quad \text{Equation 2}$$

where $N_{sc}$ represents the number of subcarriers for one PRB, $m_0$ is determined based on a cyclic shift pair index selected (for example, $m_0 \in \{1, 2, 3, 6\}$), where $m_{ind}$ represents the cyclic shift value mapped with the 1-bit indication value (for example, a 1-bit indication value of "1" may be mapped to $m_{ind}=0$ or $m_{ind}=6$), and $f(c(n_{slot}, l))$ represents a function of a pseudo-random sequence $c(n_{slot}, l)$ (for example, a length-31 Gold sequence with variable $n_{slot}$ as the slot index, within a radio frame, of the slot used for transmitting the sequence, and variable l represents the symbol index of the symbol used for transmitting the sequence). In some aspects, the resources allocated for the sequence may be based on mini-slots (for example, a sub-slot with 2, 4, or 7 symbols within a slot). In some aspects, the resources allocated for the sequence may be the last one or two symbols (for example, $l \in \{12, 13\}$ for a slot with 14 symbols) within a slot before the ending gap (for example, symbol 14). The resource allocation for the sequence may be pre-configured or configured or specified.

A transmitting UE may transmit the sidelink indication signal, including the sequence, according to an offset 320. For instance, in examples in which the transmitting UE (for example, the UE 115-b) has sidelink one or more packets available for transmission prior to the sidelink on duration 310-a, then the UE 115-b may transmit the sidelink indication signal at sidelink resource 315-a (for example, at offset 320-a during the slot 305-a prior to the slot 305-b starting on duration 310, which may span one or more slots 305, such as slot 305-b and slot 305-c). In some examples, the offset 320 may span multiple slots. For instance, the UE 115-b may have one or more sidelink packets available for transmission and may transmit the sidelink indication signal, including the sequence, using the resources 315-c at offset 320-b (for example, during the slot 305-d) prior to the slot 305-f in which the on duration 310-c begins. In some examples, the on duration 310-c may span one or more slots 305 (for example, slot 305-f and slot 305-g). Similarly, another UE 115 (for example, the UE 115-c) may transmit a sidelink indication signal, including the sequence, using the resource 315-d at offset 320-b prior to the slot 305-f in which the on duration 310-d begins. In some aspects, the offset 320 may be preconfigured or configured based on a processing time at the receiving UE 115-a for entering an active state or a resource allocation for the sidelink indication signal, among other examples.

If the one or more receiving UEs 115-a do not detect a sequence (for example, no wake-up signal is received during one or more resources 315), then the one or more receiving UEs 115-a may determine not to change an active status (for example, may determine not to wake up during a subsequent on duration 310).

Multiple transmitting UEs 115 may transmit sidelink indication signals instructing one or more receiving UEs 115-a to change an active status. For example, the UE 115-b may transmit a first sidelink indication signal including a sequence indicating to the one or more receiving UEs 115-a to wake up (for instance, for on duration 310-a of a first sidelink DRX cycle), and the UE 115-c may transmit a second sidelink indication signal including a sequence indicating to one or more receiving UEs 115-a to wake up (for instance, for on duration 310-b of a second sidelink DRX cycle). The UE 115-b and the UE 115-c may transmit the same sequence (for example, with the 1-bit indication value set to "1", indicating that the UE 115-a is to wake up). In some examples, the UE 115-b and the UE 115-c may transmit the same sequence using different sidelink resources associated with different sidelink DRX cycles.

Transmitting UEs 115 may indicate during which on duration 310 (for example, where multiple forthcoming on durations associated with multiple respective sidelink DRX cycles) that the one or more receiving UEs 115-a are to wake up. For example, a transmitting UE 115 may transmit the sequence at a resource associated with a destination identifier (for example, for a sidelink DRX cycle associated with an L1 or L2 destination ID for a sidelink communication for a service). For instance, the transmitting UE 115-b may transmit the sequence on a first resource (for example, first resource 315-a) mapped or calculated with a first destination identifier, which may be associated with at least a first DRX cycle with a first on duration (for example, the on duration 310-a and the on duration 310-c). The UE 115-c may transmit the sequence on a second resource (for example, second resource 315-b) mapped or calculated with a second destination identifier, which may be associated with at least a second DRX cycle with a second on duration (for example, the on duration 310-b and the on duration 310-d). The one or more receiving UEs 115-a may monitor a set of resources 315, each resource 315 associated with a destination identifier. For example, an L1 or L2 destination identifier may indicate which sidelink DRX cycle the sequence is associated with. Thus, the one or more receiving UEs 115-a may determine which on duration 310 to monitor based on the sidelink resource at which the one or more receiving UEs 115-a receives a sequence.

In some examples, a relationship defining which sidelink resources are associated with which destination identifiers may be preconfigured or configured at the one or more UEs 115. For instance, a base station 105 (for example, if in the coverage area 110-a as shown in FIG. 2), or another UE 115 (for example, if out of the coverage area 110-a as shown in FIG. 2), or another network device, among other examples, may transmit, to the UEs, a configuration, for example, containing a lookup table (LUT). The LUT may include a mapping between a set of one or more sidelink resources 315 (for instance, PRB indices in frequency), and respective destination identifiers of a set of one or more destination identifiers. The one or more receiving UEs 115-a may monitor the sidelink resources 315 based on the configuration and may determine the on duration 310 based on which destination identifier is mapped to the sidelink resources 315 (for example, the PRB index of the PRB in frequency) on which the UE 115-a receives the sequence.

In some examples, a UEUEs 115 may calculate the sidelink resources 315 associated with a sidelink DRX cycle using an equation based on a destination identifier. For example, using PRB as an example for the sidelink resources 315 in frequency, the UE 115 may determine a PRB index of a sidelink resource 315 according to Equation 3:

$$PRB_{index}=ID_{Destination} \bmod N_{totalPRBs} \quad \text{Equation 3}$$

where $PRB_{index}$ represents a frequency resource for the sidelink resource 315, $ID_{Destination}$ represents an L1 or L2 destination identifier, and $N_{totalPRBs}$ represents the total number of PRBs allocated for sidelink resources 315. The one or more UEs 115 may therefore calculate the sidelink resources 315 in frequency based on an L1 or L2 destination identifier and a total number of PRBs allocated for sidelink resources 315 on which the transmitting UE 115 115 transmits the sequences, respectively, and the one or more receiving UEs 115-a receive the sequence accordingly.

In some aspects, transmitting UEs 115 may transmit the sequence for a sidelink DRX cycle at different resources. Each transmitting UE 115 may use a PRB from a set of PRBs associated with a destination ID. For example, mapping the PRB index with the source identifier (for example, the L1 or L2 ID associated with a transmitting UE 115) within a set of PRBs associated with a destination identifier (for example, for a sidelink DRX cycle with an L1 or L2 destination identifier for a sidelink communication for a service). For instance, the transmitting UE 115-b may transmit a first sequence on a first resource associated with a first destination identifier which may be associated with a first sidelink DRX cycle with at least a first on duration. The UE 115-c may transmit a second sequence on a second resource associated with the first destination identifier which may be associated with the DRX cycle with at least the first on duration (for example, the on duration 410-b and the on duration 410-d). The one or more receiving UEs 115-a may monitor the first and second resource and may detect the sequences transmitted from different transmitting UEs 115. For example, the Equation 3 may be modified as according to Equation 4:

$$PRB_{index}=ID \bmod N_{totalPRBs} \quad \text{Equation 4}$$

where $PRB_{index}$ represents a frequency resource for the sidelink resource 315, ID is defined as ($ID_{source}$+ $ID_{Destination}$) with $ID_{source}$ defined as an L1 or L2 source identifier and $ID_{Destination}$ defined as an L1 or L2 destination identifier, and where $N_{totalPRBs}$ represents the total number of PRBs allocated for sidelink resources 315.

Figure 4:
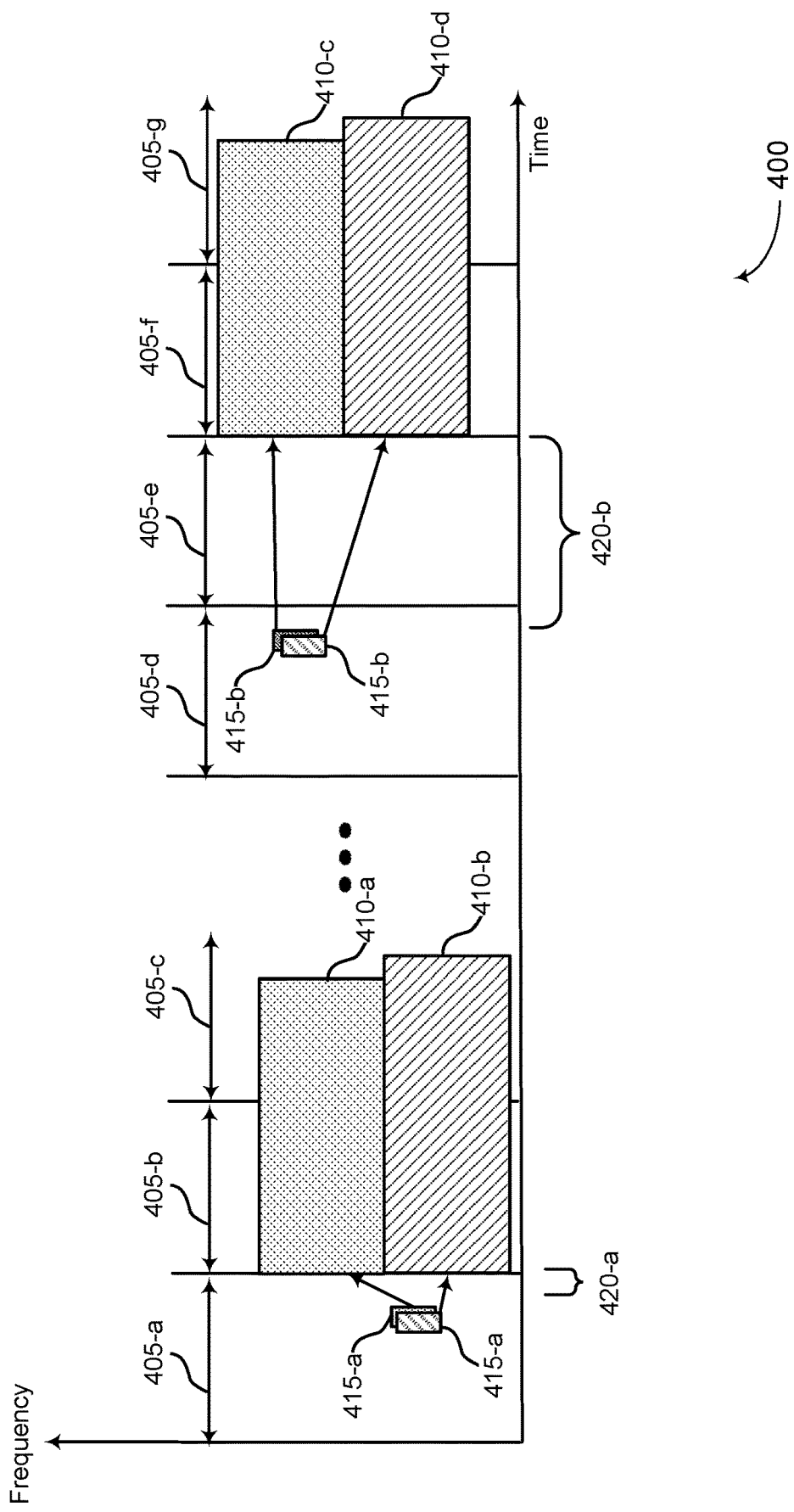
FIG. 4 illustrates an example of a timeline that supports wake-up or go-to-sleep signaling for multiple sidelink discontinuous reception cycles in accordance with aspects of the present disclosure.

FIG. 4 illustrates an example of a timeline 400 that supports wake-up or go-to-sleep signaling for multiple sidelink discontinuous reception cycles in accordance with aspects of the present disclosure. Timeline 400 may be implemented by, or may implement aspects of, wireless communications system 100, or wireless communications system 200. For example, one or more UEs 115, which may be examples of corresponding devices described with reference to FIGS. 1-3, may perform techniques described with reference to FIG. 4.

Different transmitting UEs 115 may transmit sidelink indication signal, including a sequence indicating to at least a receiving UE (for example, one or more receiving UEs 115-a described with reference to FIG. 2) to change an active status during a sidelink DRX cycle. The transmitting UE (for example, the UE 115-b described with reference to FIG. 2) may transmit the sidelink indication signal in examples in which the UE 115-b has one or more sidelink packets (for example, SCI and data) to transmit to the one or more receiving UEs 115-a during a forthcoming on duration 410. The UE 115-b may refrain from transmitting the sidelink indication signal in examples in which the UE 115-b does not have a sidelink packet to transmit to the one or more receiving UEs 115-a during the forthcoming on duration 410. The sequence included in the sidelink indication signal may be, for instance, a Zadoff-Chu (ZC) sequence. The sequence may contain a 1-bit indication mapped to a cyclic shift value, wherein the 1-bit indication may indicate to the UE 115-a to change an active status (for example, a 1-bit indication value of "1" to wake up) during a forthcoming sidelink DRX on duration.

A transmitting UE may transmit the sidelink indication signal, including the sequence, according to an offset 420. For instance, in examples in which the transmitting UE (for example, the UE 115-b) has one or more sidelink packets available for transmission prior to the sidelink on duration 410-a, then the UE 115-b may transmit the indication signal at sidelink resource 415-a (for example, at offset 420-a during the slot 405-a prior to the slot 405-b starting on duration 410, which may span one or more slots 405, such as slot 405-b and slot 405-c). In some examples, the offset 420 may span multiple slots. For instance, the UE 115-b may have one or more sidelink packets available for transmission and may transmit the sidelink indication signal, including the sequence, using the resources 415-b at offset 420-b (for example, during the slot 405-d) prior to the slot 405-f in which the on duration 410-c begins. Similarly, another UE 115 (for example, the UE 115-c) may transmit a sidelink indication signal, including the sequence, using the resource 415-b at offset 420-b prior to the slot 405-f in which the on duration 410-d begins. In some examples, the on duration 410-c may span one or more slots (for example, slot 405-f and slot 405-g). In some aspects, the offset 420 may be preconfigured or configured based on a processing time of the UE 115-a for entering an active state or resource allocation for the sidelink indication signal, among other examples.

If the one or more receiving UEs 115-a does not detect a sequence (for example, no wake-up signal is received during one or more resources 415), then the receiving UE(s) 115-a may determine not to change an active status (for example, may determine not to wake up during a subsequent on duration 410).

Multiple transmitting UEs 115 may transmit sidelink indication signals instructing the one or more receiving UEs 115-a to change an active status. For example, the UE 115-b may transmit a first sidelink indication signal including a sequence indicating to the one or more receiving UEs 115-a to wake up (for instance, for on duration 410-a of a first sidelink DRX cycle), and the UE 115-c may transmit a second sidelink indication signal including a sequence indicating to the one or more receiving UEs 115-a to wake up (for instance, for on duration 410-b of a second sidelink DRX cycle). The UE 115-b and the UE 115-c may transmit different sequences (for example, with the 1-bit indication value set to "1", indicating that the UE 115-a is to wake up) on a common sidelink resource 415 (for example, configured for sidelink DRX cycles, for different communication types such as unicast, broadcast, multicast, or groupcast, among other examples).

Transmitting UEs 115 may indicate during which on duration 410 (for example, where multiple forthcoming on durations associated with multiple respective sidelink DRX cycles) that the one or more receiving UEs 115-a is to wake up. For example, a transmitting UE 115 may transmit the sequence at a common resource. Each transmitting UE 115 may use a different initial value $c_{init}$ for the pseudo-random sequence $c(n_{slot}, 1)$ used for calculating the cyclic shift (for example, exemplified in Equation 2 as described with reference to FIG. 3) of the sequence included in the sidelink indication signal. The sequence may be generated based on an initial value $c_{init}$ that is associated with a destination identifier (for example, for a sidelink DRX cycle with an L1 or L2 destination ID for a sidelink communication for a service). For instance, the transmitting UE 115-*b* may transmit a first sequence on common resource 415-*a*, according to a first initial value $c_{init1}$ mapped or calculated with a first destination identifier which may be associated with a first sidelink DRX cycle with at least a first on duration (for example, the on duration 410-*a* and the on duration 410-*c*). The UE 115-*c* may transmit a second sequence on the same common resource 415-*a*, according to a second initial value $c_{init2}$ mapped or calculated with a second destination identifier which may be associated with a second DRX cycle with at least a second on duration (for example, the on duration 410-*b* and the on duration 410-*d*). The one or more receiving UEs 115-*a* may monitor the common sidelink resource 415-*a* and may detect the different sequences with the different initial values mapped or calculated with different destination identifiers (for example, the two different sequences may be code-division multiplexed (CDMed) with each other at a common resource). The L1 or L2 destination identifiers for the on duration 410-*a* and the on duration 410-*b* may indicate which sidelink DRX cycle each sequence is associated with. Thus, the UE 115-*a* may determine which on duration 410-*a* to monitor based on the initial value in the received sequence.

In some examples, a relationship defining which initial values are associated with which destination identifiers may be preconfigured or configured at the one or more UEs 115. For instance, a base station 105 (for example, if the receiving UE 115-*a* is located in the coverage area 110-*a* as shown in FIG. 2), or another UE 115 (for example, if the receiving UE 115-*a* is located out of the coverage area 110-*a* as shown in FIG. 2), or another network device, among other examples, may transmit, to the one or more UEs 115, a configuration, for example, containing a lookup table (LUT). The LUT may include a mapping between a set of one or more initial values and respective destination identifiers of a set of one or more destination identifiers. The at least receiving UE 115-*a* may monitor the common resource and may detect sidelink indication signals with different sequences, and may determine the on duration 410 during which to wake up for monitoring based on which destination identifier is mapped to the initial value of a received sequence.

In some examples, the one or more UEs 115 may calculate an initial value of a sequence based on a destination identifier associated with an on duration 410 of a sidelink DRX cycle based on an equation. For example, the UE 115-*a* may determine an initial value according to Equation 5:

$$c_{init} = ID_{destination} \bmod L_{sequence} \qquad \text{Equation 5}$$

where $c_{init}$ represents the initial value for generating a sequence, $ID_{destination}$ represents an L1 or L2 destination identifier, and $L_{sequence}$ represents a length of the pseudo-random sequence $c(n_{slot}, 1)$ used for calculating the cyclic shift of the sequence, as exemplified in Equation 2 as described with reference to FIG. 3. The one or more UEs 115 may therefore calculate an initial value of the pseudo-random sequence $c(n_{slot}, 1)$ based on a destination identifier (for example, an L1 or L2 destination identifier) and a length of the sequence.

In some examples, transmitting UEs 115 may transmit the sequence at a common resource. Each transmitting UE 115 may use a different cyclic shift pair index selected (for example, $m_0 \in \{1, 2, 3, 6\}$) for calculating the cyclic shift of the sequence included in the sidelink indication signal. The sequence may be generated based on cyclic shift pair index $m_0$ that is associated with a destination identifier (for example, for a sidelink DRX cycle with an L1 or L2 destination ID for a sidelink communication for a service). For instance, the transmitting UE 115-*b* may transmit a first sequence on common resource 415-*a*, according to a first cyclic shift pair index $m_{01}$ mapped or calculated with a first destination identifier which may be associated with a first sidelink DRX cycle with at least a first on duration (for example, the on duration 410-*a* and the on duration 410-*c*). The UE 115-*c* may transmit a second sequence on the same common resource 415-*a*, according to a second cyclic shift pair index $m_{02}$ mapped or calculated with a second destination identifier which may be associated with a second DRX cycle with at least a second on duration (for example, the on duration 410-*b* and the on duration 410-*d*). The one or more receiving UEs 115-*a* may monitor the common sidelink resource 415-*a* and may detect the different sequences with the different cyclic shift pair index $m_0$ values mapped or calculated with different destination identifiers (for example, the two different sequences may be code-division multiplexed (CDMed) with each other at a common resource). The L1 or L2 destination identifiers for the on duration 410-*a* and the on duration 410-*b* may indicate which sidelink DRX cycle each sequence is associated with. Thus, the UE 115-*a* may determine which on duration 410-*a* to monitor based on the initial value in the received sequence.

Figure 5:
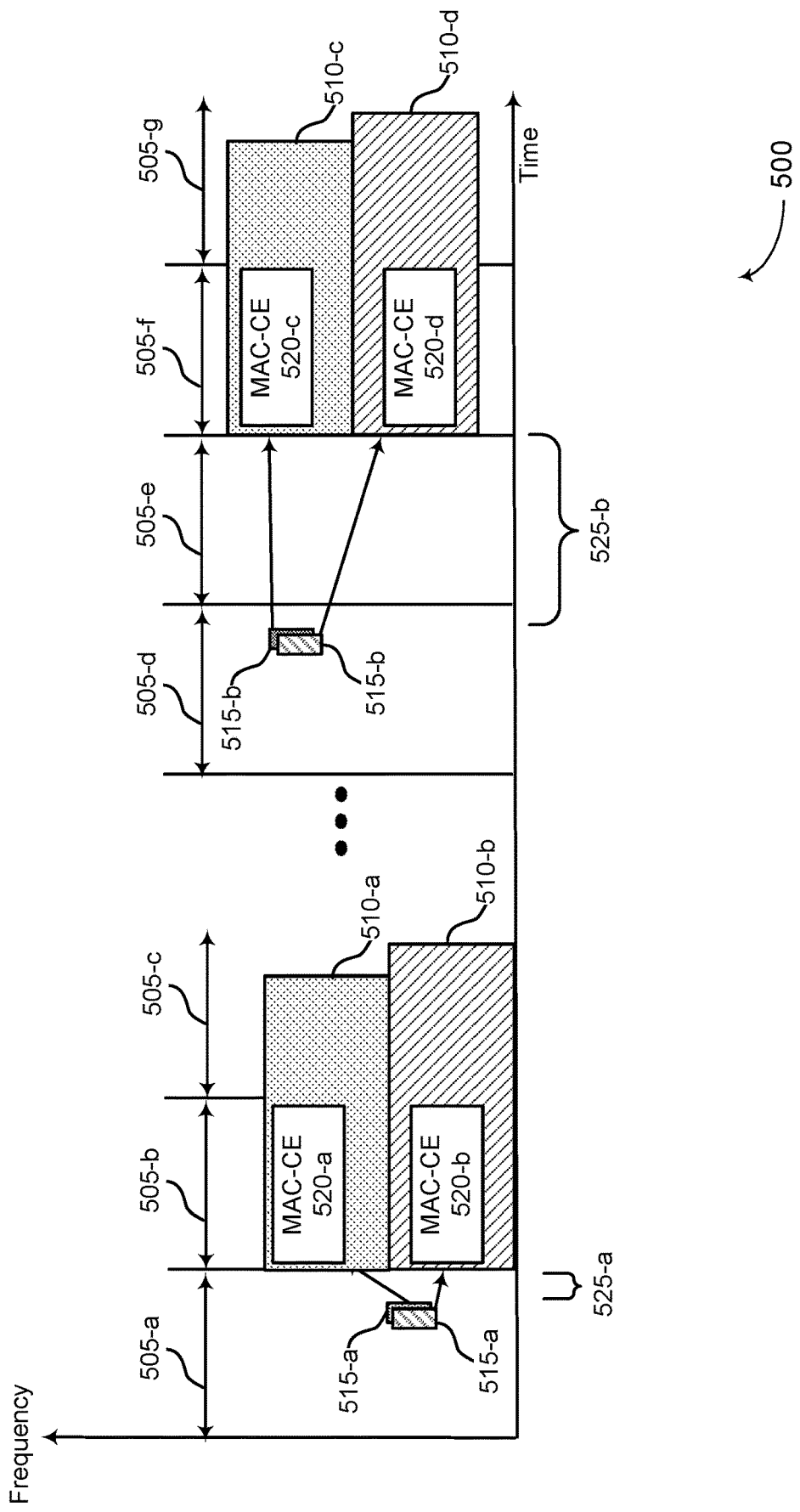
FIG. 5 illustrates an example of a timeline that supports wake-up or go-to-sleep signaling for multiple sidelink discontinuous reception cycles in accordance with aspects of the present disclosure.

FIG. 5 illustrates an example of a timeline 500 that supports wake-up signaling for multiple sidelink discontinuous reception cycles in accordance with aspects of the present disclosure. Wireless communications system 200 may be implemented by, or may implement aspects of, wireless communications system 100, or wireless communications system 200. For example, one or more UEs 115, which may be examples of corresponding devices described with reference to FIGS. 1-4, may perform techniques described with reference to FIG. 5.

A transmitting UE 115 may transmit a two-stage sidelink indication to at least a receiving UE 115-*a* indicating that the one or more receiving UEs 115-*a* is to wake up to receive sidelink packets. A transmitting UE 115 (for example, the UE 115-*b* described with reference to FIG. 2) may transmit a first stage indication signal with a sequence (for example, a ZC sequence) indicating that the UE 115-*a* is to wake up to receive a second stage sidelink indication (for example, a MAC-CE 520). For example, the ZC sequence may contain a 1-bit indication value of "1", instructing the one or more receiving UEs 115-*a* to wake up to monitor for a second stage sidelink indication during a forthcoming on duration 510. The UE 115-*b* may transmit the sidelink indication including the sequence in examples in which the UE 115-*b* has one or more sidelink packets to transmit to the one or more receiving UEs 115-*a* in a forthcoming on duration. For instance, the on duration 510-*a* (for example, of a first sidelink DRX cycle including the on duration 510-*a* and the on duration 510-*c*) may begin during slot 505-*b*, and may span one or more slots 505 (for example, at least slot 505-*c*). In some example, in examples in which a transmitting UE 115-*b* has one or more sidelink packets to transmit to the one or more receiving UEs 115-*a* and may transmit the first stage sidelink indication signal including the sequence to the one or more receiving UEs 115-*a* using the sidelink resource 515-*a* according to an offset 525-*a*. In some examples, the offset 525 may span multiple slots. For instance, in examples in which the UE 115-*b* has sidelink packet(s) to transmit to the one or more receiving UEs 115-*a* during on duration 510-*c* (for example in slot 505-*f* or slot 505-*g*) and may transmit the first stage sidelink indication signal including the sequence to the one or more receiving UEs 115-*a* at sidelink resource 515-*b* according to offset 525-*b*. In some examples, multiple transmitting UEs 115 may transmit first stage sidelink indication signals on a same resource 515. For instance, the UE 115-*b* may transmit a first stage sidelink indication signal with a first sequence at the sidelink resource 515-*b*, and the UE 115-*c* may transmit a first stage sidelink indication signal with a second sequence at the sidelink resource 515-*b*. The first sequence and the second sequence may be a same sequence with 1-bit indication value set to "1" for wakeup or may be different sequences with different initial values for $c_{init}$ or different cyclic shift pair index values for $m_0$ (for example, as exemplified in Equation 2 as described with reference to FIG. 3) associated with different destination identifiers. In such cases, the second stage indication may contain more information for changing an active status (for example, waking up). In some aspects, the offset 525 may be preconfigured or configured based on a processing time of the UE 115-*a* for entering an active state or a resource allocation for the first stage sidelink indication signal, among other examples.

A transmitting UE 115-*b* may transmit a first stage sidelink indication signal, including a sequence indicating that the one or more receiving UEs 115-*a* is to wake up for a subsequent on duration 510, and may transmit a second stage sidelink indication including additional information supporting sidelink communications. For example, the UE 115-*b* may transmit a first stage sidelink indication signal including a sequence with the 1-bit indication value set to "1," indicating that one or more receiving UEs 115-*a* is to wake up for on duration 510-*a*. During on duration 510-*a*, the UE 115-*b* may transmit a second stage sidelink indication. The second stage sidelink indication may be, for example, a MAC-CE message 520 (for example, MAC-CE 520-*a* in the first slot of the on duration 510-*a*). A MAC-CE message 520 may include an L2 source identifier, which may identify the transmitting UE 115-*b*, an L2 destination identifier, which may identify the sidelink DRX cycle associated with on duration 510-*a* for a sidelink communication for a service in which the UE 115-*b* will transmit the one or more sidelink packets to one or more receiving UEs 115-*a*, a duration to stay wake up (such as, a number of on durations 510 of a sidelink DRX cycle, a number of sidelink DRX cycles, or an amount of time to wake up for, among other examples), or a location of the transmitting UE 115 and a communication range, based on which the one or more receiving UEs 115-*a* may determine whether to ignore the received two-stage indication.

If one or more receiving UEs 115-*a* detect a first stage sidelink indication sequence signal containing a sequence with the 1-bit indication value set to "1" for wakeup on a sidelink resource 515, then the one or more receiving UEs 115-*a* may wake up and monitor for the second stage sidelink indication (for example, a MAC-CE 520) in a subsequent on duration 510. The one or more receiving UEs 115-*a* may then determine whether to monitor for the one or more sidelink packets to be transmitted by the UE 115-*b* based on the contents of the MAC-CE 520. The one or more receiving UEs 115-*a* may determine, for example, whether the source identifier for the transmitting UE 115-*b* is relevant to the UE 115-*a*, in examples in which the forthcoming one or more sidelink packets is of relevant to the one or more receiving UEs 115-*a* (for example, in examples in which the transmitting UE 115-*b* is transmitting on an on duration that the UE 115-*a* is monitoring), among other examples.

In some examples, UE 115-*b* may transmit the first stage sidelink indication signal including a first sequence at the sidelink resource 515-*a*. The UE 115-*c* may also transmit a first stage sidelink indication signal including a second sequence at the sidelink resource 515-*a*. The UE 115-*b* may prepare one or more unicast sidelink packets for transmission during the on duration 510-*a*, and the UE 115-*c* may prepare one or more groupcast sidelink packet(s) for transmission during the on duration 510-*b*. The one or more receiving UEs 115-*a* may receive both first stage indication signals at the resource 515-*a*. The one or more receiving UEs 115-*a* may further monitor the MAC-CE 520-*a*, and the MAC-CE 520-*b*, to determine additional information regarding monitoring for one or more forthcoming sidelink packets. For instance, the one or more receiving UEs 115-*a* may monitor for the MAC-CE 520-*a* during a first portion (for example, slot 505-*b*) of on duration 510-*a*. The one or more receiving UEs 115-*a* may receive the MAC-CE 520-*a*, which may include an indication that the UE 115-*b* is transmitting one or more unicast packets to the UE 115-*a* during on duration 510-*a*. For instance, the MAC-CE 520-*a* may include an L2 source identifier for the UE 115-*b*, which is communicating with the UE 115-*a* in a unicast mode. Having decoded the MAC-CE 520-*a*, the UE 115-*a* may determine to stay awake for the duration of the on duration 510-*a*. In some examples, the one or more receiving UEs 115-*a* may determine to wake up for multiple on durations (for example, the on duration 510-*a*, and the on duration 510-*b* of a first sidelink DRX cycle). Similarly, a UE may receive a first stage sidelink indication signal at sidelink resource 515-*b*, and may receive a second stage sidelink indication MAC-CE 520-*c* or MAC-CE 520-*d* at the beginning of on duration 510-*c* or on duration 510-*d*, respectively.

The one or more receiving UEs 115-*a* may also receive the first stage sidelink indication signal from the UE 115-*c*, which may be a multicast UE, at sidelink resource 515-*a*. The one or more receiving UEs 115-*a* may wake up and monitor the MAC-CE 520-*b* during the on duration 510-*b* of the second DRX cycle. For instance, the MAC-CE 520-*b* may include additional information, such as a L2 destination identifier associated with the second DRX cycle for one or more broadcast packets. In examples in which one or more receiving UEs 115-*a* decodes the MAC-CE and identifies the L2 destination identifier associated with the second DRX cycle, then the one or more receiving UEs 115-*a* may determine to stay awake for the remainder of the on duration 510-*b*, one or more subsequent on durations 510-*d*, among other examples. In some examples, the one or more receiving UEs 115-*a* may conserve power by going back to sleep in examples in which one or more pending broadcast sidelink packets are not relevant to the one or more receiving UEs 115-*a*. For example, the one or more receiving UEs 115-*a* may receive, in the MAC-CE 520-*b*, a source identifier for the UE 115-*c*. The UE 115-*c* may provide one or more broadcast packets to other UEs 115. In examples in which the other UEs 115 includes the receiving UEs 115-*a*, the receiving UE 115-*a* may determine to remain awake for the duration of the on duration 510-*b*. In some examples, the one or more receiving UEs 115-*a* may not determine that one or more broadcast packets from the UE 115-*c* are relevant to the one or more receiving UEs 115-*a* (for example, as indicated by the source identifier of the UE 115-*c*). In such examples, the one or more receiving UEs 115-*a* may go back to sleep for the remainder of the on duration 510-*b*, thus conserving power by not staying awake unnecessarily.

In some examples, a first portion (for example, a first slot 505) of each on duration may be reserved for second stage sidelink indications (for example, MAC-CEs 520). Upon receiving a first stage sidelink indication signal instructing the one or more receiving UEs 115-*a* to wake up, the one or more receiving UEs 115-*a* may monitor for second stage sidelink indications during the first slot 505 of each overlapping on duration 510. For instance, the one or more receiving UEs 115-*a* may receive a first stage sidelink indication signal at sidelink resource 515-*a* from the UE 115-*b*, but the UE 115-*c* may have no sidelink packet for transmission during the on duration 510-*b*, and may therefore not transmit a sidelink indication signal at sidelink resource 515-*a* instructing the one or more receiving UEs 115-*a* to wake up. However, the one or more receiving UEs 115-*a* may not be able to determine which on duration 510 of the overlapping on durations 510 for which the one or more receiving UEs 115-*a* is instructed to wake up. In such examples, the one or more receiving UEs 115-*a* may wake up and monitor for a MAC-CE 520 during slot 505-*b* (for example, on the frequency resources of both on duration 510-*a* and on duration 510-*b*, which may or may not overlap in the frequency domain). The one or more receiving UEs 115-*a* may receive the MAC-CE 520-*a*, and may determine to remain awake for at least the duration of on duration 510-*a* based on receiving MAC-CE 520-*a*, and may receive one or more sidelink packets from the UE 115-*b*. However, the one or more receiving UEs 115-*a* may not receive the MAC-CE 520-*b* (for example, which was not transmitted by the UE 115-*c*), and may therefore refrain from monitoring for sidelink packet(s) from the UE 115-*c* during the on duration 510-*b*. In examples in which the only MAC-CE that is transmitted during a first slot 505-*b* is for a sidelink DRX cycle or a UE 115 that is not relevant to the one or more receiving UEs 115-*a*, then the one or more receiving UEs 115-*a* may go back to sleep for the duration of the on duration 510.

Figure 6:
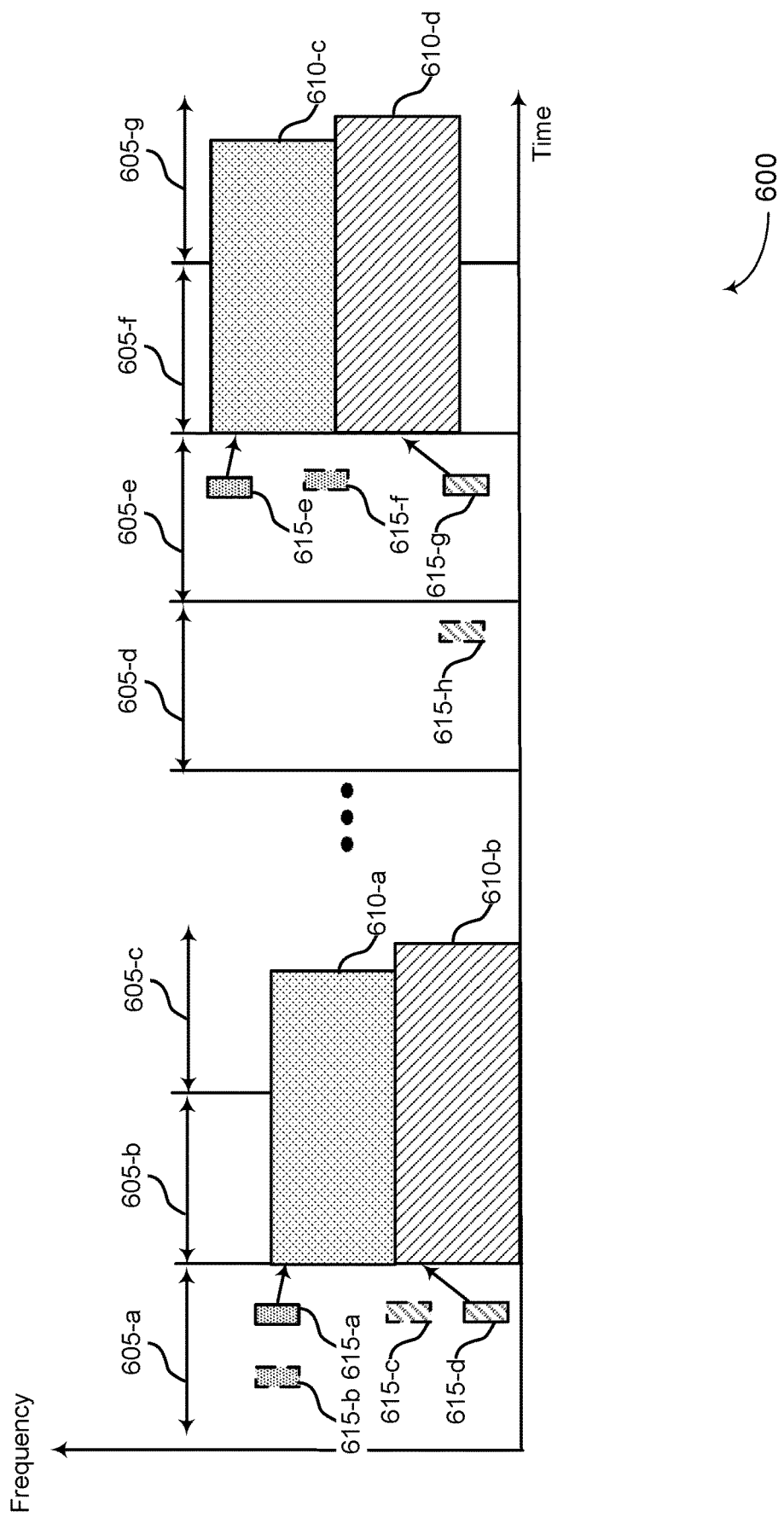
FIG. 6 illustrates an example of a timeline that supports wake-up or go-to-sleep signaling for multiple sidelink discontinuous reception cycles in accordance with aspects of the present disclosure.

FIG. 6 illustrates an example of a timeline 600 that supports wake-up or go-to-sleep signaling for multiple sidelink discontinuous reception cycles in accordance with aspects of the present disclosure. Timeline 600 may be implemented by, or may implement aspects of, wireless communications system 100, or wireless communications system 200. For example, one or more UEs 115, which may be examples of corresponding devices described with reference to FIGS. 1-5, may perform techniques described with reference to FIG. 6.

A transmitting UE 115 (for example, the UE 115-*b* described with reference to FIG. 2), may transmit a sidelink indication signal including a sequence (for example, a ZC sequence) indicating that the UE 115-*a* is to wake up or go to sleep. Instead of providing the sequence in examples in which the UE 115-*a* is to wake up (but not providing the sequence in examples in which the UE 115-*a* is to remain asleep) as described with reference to FIGS. 3-4, the UE 115-*b* may transmit an explicit instruction to either wake up (for example, in examples in which the UE 115-*b* has one or more sidelink packet(s) to transmit to the other one or more UEs 115), or an explicit instruction to go to sleep (for example, in examples in which the UE 115-*b* has no sidelink packet to transmit to the one or more other UEs 115). The UE 115-*b* may transmit the sidelink indication signal at one or more symbols at the end of a slot 605 prior to a next sidelink on duration 610 (for example, in slot 605-*a* for on duration 610-*a* or on duration 610-*b*), or in a previous slot 605 that is one or more slots prior to the on duration 610 (for example, in slot 605-*d*, which is two slots 605 prior to the on duration 610-*c* and the on duration 610-*d*). Sidelink resources 615 may be allocated for transmitting sidelink indication signals including sequences. In examples in which a sequence is not detected during the allocated sidelink resources 615 (for example, for a DRX cycle or due to failed detection), then the one or more receiving UEs 115-*a* may determine whether to wake up for an on duration 610 or not based on a configuration for waking up or going to sleep (for example, based on configuration of each sidelink DRX cycle).

In some examples, a transmitting UE 115-*b* may indicate, in the sequence, whether a receiving UE 115-*a* is to wake up or go to sleep for multiple on durations associated with multiple sidelink DRX cycles, respectively. For instance, the UE 115-*b* may transmit, to the one or more receiving UEs 115-*a* (for instance, on a sidelink resource 615), a sidelink indication signal including a sequence, where the 1-bit indication value is set to "1" for wakeup. Such a sequence may indicate that the one or more receiving UEs 115-*a* is to wake up for on duration 610-*a*, on duration 610-*c*, or both, of a first sidelink DRX cycle. The UE 115-*b* may transmit, to the one or more receiving UEs 115-*a* (for instance, on a sidelink resource 615), a sidelink indication signal including a sequence, where the 1-bit indication value is set to "0" for a go-to-sleep signal. Such a sequence may indicate that the one or more receiving UEs 115-*a* are to go to sleep for on duration 610-*a*, on duration 610-*c*, or both, of a first sidelink DRX cycle. In such examples, the UE 115-*b* may explicitly indicate to the UE 115-*a*, by using different sequences (for example, with 1-bit indication value set to "0" or "1", with $m_{ind}$ in Equation 2 mapped with $m_{ind}=0$ for "0" and $m_{ind}=6$ for "1" or with $m_{ind}$ in Equation 2 mapped with $m_{ind}=6$ for "0" and $m_{ind}=0$ for "1", depending on the instruction), whether the one or more receiving UEs 115-*a* are to wake up for a next on duration 610, or go to sleep during the next on duration 610. The UE 115-*b* may transmit such sequences on a common sidelink resources 615 (for example, as described in greater detail with reference to FIG. 4), or on separate sidelink resources 615 that are associated with different L2 destination identifiers of different DRX cycles. (for example, as described in greater detail with reference to FIG. 3).

In some examples, a transmitting UE 115-*b* may indicate whether the receiving UE(s) 115-*a* is to go to sleep or wake up based on the sidelink resource on which the transmitting UE 115-*b* transmits the sequence. The UE 115-*b* may transmit a same sequence on a first sidelink resource to indicate that the one or more receiving UEs 115-*a* are to wake up, or a second sidelink resource to indicate that the one or more receiving UEs 115-*a* are to go to sleep. For example, the UE 115-*b* with sidelink packets for transmission to the one or more receiving UEs 115-*a* may transmit a sequence (for example, instructing the one or more receiving UEs 115-*a* to wake up) at a first sidelink resource 615 associated with an L2 destination identifier (for example, for a DRX cycle set for broadcast, groupcast, multicast, or unicast, among other examples. A transmitting UE 115-*b* without any packets available for transmission to the one or more receiving UEs 115-*a* via any DRX cycle may send the same sequence (for example, instructing the UE 115-*a* to go to sleep) at a second sidelink resource 615 associated with a destination identifier (for example, for the sidelink DRX cycle with the L1 or L2 destination identifier set for a broadcast, groupcast, or unicast communication for a service).

Sidelink resources 615 for indicating that the UE 115-a is to wake up or go to sleep may be offset from each other in time resources, frequency resources, or both. For example, a first sidelink resource 615-a and a second sidelink resource 615-b may both be associated with a destination identifier for the first DRX cycle (for example, including the on duration 610-a, the on duration 610-c, or both). The sidelink resource 615-a may be used to indicate that the UE 115-a is to wake up for on duration 610-a, and the sidelink resource 615-b may be used to indicate that the UE 115-a is to go to sleep for the on duration 610-a. The one or more receiving UEs 115-a may monitor both the sidelink resource 615-a and the sidelink resource 615-b. In examples in which the one or more receiving UEs 115-a receives the sequence on sidelink resource 615-a, then the UE 115-a may determine the on duration 610-a that is associated with the sidelink resource 615-a for a wakeup signal and the sidelink resource 615-b for a go-to-sleep signal, and may wake up for on duration 610-a to receive sidelink packets from the UE 115-b based on having received the sequence on the sidelink resource 615-a. In examples in which the one or more receiving UEs 115-a receives the sidelink indication including the sequence at sidelink resource 615-b, then the UE 115-a may not wake up during on duration 610-a. The sidelink resource 615-a and the sidelink resource 615-b may be separate from each other by an offset in time. The offset in time may be less than on slot (for example, both the sidelink resource 615-a and the sidelink resource 615-b may be located in the same slot 605-a, to trigger a change in an active state of the UE 115-a during slot 605-b and slot 605-c of on duration 610-a). The offset in time may be greater than one slot. For example, the sidelink resource 615-h and the sidelink resource 615-g may be associated with the destination identifier for the on duration 610-d, and may be separated in the time domain by over on slot (for example, the sidelink resource 615-h may be located in slot 605-d, and the sidelink resource 615-g may be located in slot 605-e, and both sidelink resource 615-h and sidelink resource 615-g may be associated with the on duration 610 which spans slot 605-f and slot 605-g).

Sidelink resources 615 for indicating that the UE 115-a is to wake up or go to sleep may be offset from each other in time resources, frequency resources, or both. For example, a first sidelink resource 615-c and a second sidelink resource 615-d may both be associated with a destination identifier for the second DRX cycle (for example, including the on duration 610-b, the on duration 610-d, or both). The sidelink resource 615-c may be used to indicate that the UE 115-a is to wake up for on duration 610-b, and the sidelink resource 615-d may be used to indicate that the UE 115-a is to go to sleep for the on duration 610-b. The one or more receiving UEs 115-a may monitor both the sidelink resource 615-c and the sidelink resource 615-d. In examples in which the one or more receiving UEs 115-a receive the sequence on sidelink resource 615-c, then the UE 115-a may determine the on duration 610-b that is associated with the sidelink resource 615-c and the sidelink resource 615-d, and may wake up for on duration 610-a to receive sidelink packet(s) from the UE 115-b based on having received the sequence on the sidelink resource 615-c. In examples in which the UE 115-a receives the sidelink indication signal including the sequence at sidelink resource 615-d, then the UE 115-a may not wake up during on duration 610-b. The sidelink resource 615-c and the sidelink resource 615-d may be separate from each other by an offset in frequency. The offset in frequency may be less than the frequency range of an on duration (for example, both the sidelink resource 615-c and the sidelink resource 615-d may be located in the same frequency range as corresponding on duration 610-b). The offset in frequency may be greater than the frequency range of an on duration 610. For example, the sidelink resource 615-e and the sidelink resource 615-f may be associated with the destination identifier for the on duration 610-c, and may be located within the frequency range of on duration 610-c or outside of the frequency range of on duration 610-c.

In some examples, the locations of sidelink resources 615 may be preconfigured or configured to the one or more UEs 115, for instance, by a base station 105 (for example, if the UE 115-a is located in the coverage area 110-a as shown in FIG. 2), by another UE 115 (for example, if the UE 115-a is located out of the coverage area 110-a as shown in FIG. 2), by a network device, or defined in one or more standards documents, among other examples. The configuration may include a mapping between a destination identifier, and an offset in time (for example, symbols or slots), an offset in frequency (for example, in PRBs or subchannels), or a combination thereof. For instance, the one or more receiving UEs 115-a may be configured with a LUT indicating a mapping between offsets in PRBs or subchannels in frequency and L1 or L2 destination identifiers, or offsets in symbols or slots in time and L1 or L2 destination identifiers. In such examples, upon receiving the sequence at a sidelink resource 615, the one or more receiving UEs 115-a may determine the associated L1 or L2 destination identifier and instruction to change a wakeup status (for example, to wake up or to go to sleep) based on the sidelink resource 615 on which the sequence was received based on the LUT. The one or more UEs 115-a may change an active state accordingly (for example, to wake up or to go to sleep).

In some examples, the locations of sidelink resources 615 may be calculated by the one or more UEs 115. For example, the one or more UEs 115 may determine a frequency resource of sidelink resource 615 for instructing one or more UEs 115-a to wakeup according to Equation 6 (for example, using PRB):

$$\text{Wakeup}PRB_{index} = ID \bmod N_{totalPRBs} \quad \text{Equation 6}$$

where the WakeupPRB$_{index}$ is the frequency resource indexed in PRB for sidelink resource 615, the ID$_{Destination}$ is ID$_{Destination}$ or (ID$_{source}$+ID$_{Destination}$) with an L1 or L2 source identifier associated with a transmitting UE and an L1 or L2 destination identifier associated with a sidelink communication, and the N$_{totalPRBs}$ represents the total frequency resources in PRBs allocated to sidelink resources 615. The one or more UEs 115 may determine a frequency resource of sidelink resource 615 instructing the one or more UEs 115 to go-to-sleep according to Equation 7 (for example, using PRB):

$$\text{GoToSleep}PRB_{index} = (ID \bmod N_{totalPRBs}) + PRB_{offset} \quad \text{Equation 7}$$

where the PRB$_{offset}$ may be a positive or negative integer number in PRBs.

Figure 7:
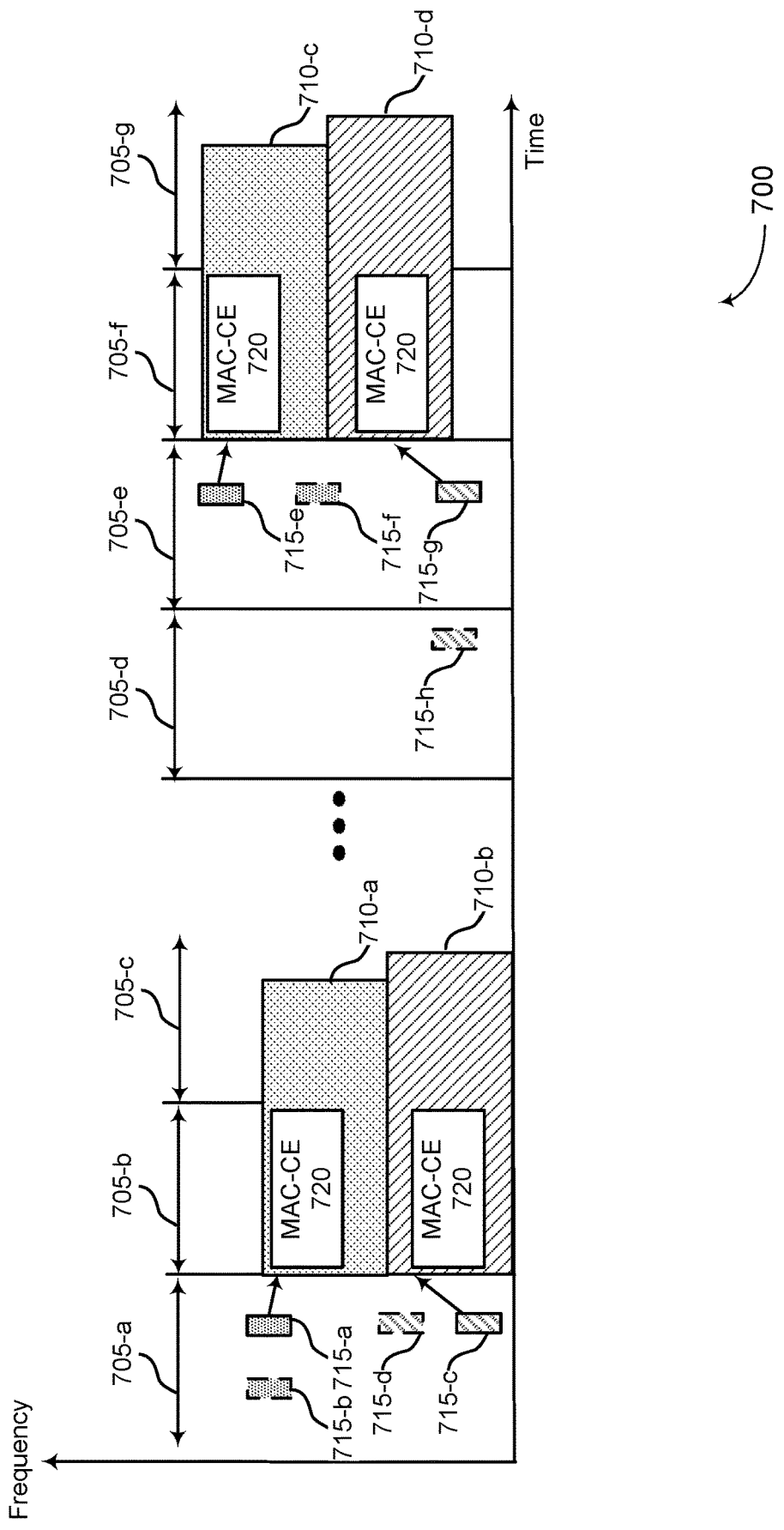
FIG. 7 illustrates an example of a timeline that supports wake-up or go-to-sleep signaling for multiple sidelink discontinuous reception cycles in accordance with aspects of the present disclosure.

FIG. 7 illustrates an example of a timeline 700 that supports wake-up or go-to-sleep signaling for multiple sidelink discontinuous reception cycles in accordance with aspects of the present disclosure. Timeline 700 may be implemented by, or may implement aspects of, wireless communications system 100, or wireless communications system 200. For example, one or more UEs 115, which may be examples of corresponding devices described with reference to FIGS. 1-6, may perform techniques described with reference to FIG. 7.

A transmitting UE 115-b may transmit a two-stage sidelink indication to one or more receiving UEs 115-a. The first stage sidelink indication signal may explicitly indicate whether the one or more receiving UEs 115-*a* are to wake up to receive one or more sidelink packets, or go to sleep. The UE 115-*b* may transmit a first stage indication signal with a sequence (for example, a ZC sequence) indicating whether the one or more receiving UEs 115-*a* is to wake up to receive a second stage sidelink indication (for example, a MAC-CE 720). The 1-bit indication value of the ZC sequence may be set to "1", instructing the one or more receiving UEs 115-*a* to wake up to monitor for a second stage sidelink indication during a forthcoming on duration 710. In some examples, the 1-bit indication value of the ZC sequence may be set to "0", indicating that the one or more receiving UEs 115-*a* are to go to sleep (and does not need to monitor for a second stage sidelink indication during a next on duration 710). The UE 115-*b* may transmit the sidelink indication signal including the sequence in examples in which the UE 115-*b* has one or more sidelink packets to transmit to the one or more receiving UEs 115-*a* in a forthcoming on duration 710. The UE 115-*b* may transmit a first stage sidelink indication signal in a slot prior to an on duration 710 (for example, during the slot 705-*a* prior to on duration 710-*a* and on duration 710-*b* that span slot 705-*b* and slot 705-*c*, or during the slot 705-*d* or the slot 705-*e* prior to on duration 710-*c* and on duration 710-*d* that span slot 705-*f* and slot 705-*g*. The UE 115-*b* may transmit the first stage sidelink indication signal at one or more symbols at the end of a slot 705 prior to a next sidelink on duration 710 (for example, in slot 705-*a* for on duration 710-*a* or on duration 710-*b*), or in a previous slot 705 that is one or more slots prior to the on duration 710 (for example, in slot 705-*d*, which is two slots 705 prior to the on duration 710-*c* and the on duration 710-*d*). Sidelink resources 715 may be preconfigured or configured or calculated as detailed in FIG. 6.

The first stage sidelink indication signal including the sequence may indicate whether the one or more receiving UEs 115-*a* is to wake up or not, and a second stage sidelink indication (for example, in a MAC-CE 720) may include additional information. For example the second stage indication in a MAC-CE 720 may include an L2 source identifier (for example, identifying the transmitting UE 115-*b*), an L2 destination identifier (for example, identifying a sidelink DRX for a sidelink communication in broadcast, groupcast, or multicast), time duration for waking up or going to sleep (for example, a time duration for wakeup or go-to-sleep in a number of on durations 710 or sidelink DRX cycles, among other examples), or other information for waking up or going to sleep (for example, a communication range, and a location of the transmitting UE, so that the one or more receiving UEs 115-*a* may determine to ignore the sidelink indication if located out of the communication range of the transmitting UE 115 based on comparing the communication range with the distance between the transmitting UE 115 and the receiving UE 115-*a*, calculated with the location of the transmitting UE and the location of the receiving UE 115-*a*, for example, if the distance is larger than the communication range). In examples in which the one or more receiving UEs 115-*a* detect a first stage wakeup signal (for example, a sequence instructing the one or more receiving UEs 115-*a* to wake up), the one or more receiving UEs 115-*a* may wake up during a next on duration 710 to monitor for a MAC-CE 720. In some examples in which the one or more receiving UEs 115-*a* detect a first stage go-to-sleep signal (for example, a sequence instructing the UE 115-*a* to go to sleep), the one or more receiving UEs 115-*a* may go to sleep during the next on duration 710. In some examples in which the one or more receiving UEs 115-*a* detect a first stage wakeup signal (for example, a sequence instructing the UE 115- to wake up the one or more receiving UEs 115-*a* may wake up to monitor for a MAC-CE 720 in a next on duration 710. The one or more receiving UEs 115-*a* may receive a MAC-CE 720 to determine in examples in which the on duration 710 is for communication to the UE 115-*a* (for example, as identified by the L2 destination identifier in the MAC-CE 720), or in examples in which the on duration 710 is for communication from a specific UE 115 (for example, as identified by the L2 source identifier for the transmitting UE 115 in the Mac-CE 720), among other examples, and may then determine whether to stay active or go to sleep, for example, for a duration indicated in the MAC-CE 720.

In some examples, the UE 115-*b* may indicate whether the UE 115-*a* is to wake up or go to sleep by transmitting first stage sidelink indication signal including a sequence (for example, a same sequence) on a sidelink resource 715 for first stage sidelink indication signal indicating either a wakeup instruction or a go-to-sleep instruction for a particular L1 or L2 destination identifier. For instance, both the sidelink resource 715-*a* and the sidelink resource 715-*b* may be associated with the L1 or L2 destination identifier of a sidelink DRX cycle including on duration 710-*a*. Both the sidelink resource 715-*c* and the sidelink resource 715-*d* may be associated with the L1 or L2 destination identifier of a sidelink DRX cycle including on duration 710-*b*. Both the sidelink resource 715-*e* and the sidelink resource 715-*f* may be associated with the L1 or L2 destination identifier of a sidelink DRX cycle including on duration 710-*c*. Both the sidelink resource 715-*g* and the sidelink resource 715-*h* may be associated with the L1 or L2 destination identifier of a DRX cycle including on duration 710-*d*. Each pair of sidelink resources 715 associated with an L1 or L2 destination identifier may be separated by an offset in time (for example, the sidelink resource 715-*b* and the sidelink resource 715-*a*, or the sidelink resource 715-*h* and the sidelink resource 715-*g*), an offset in frequency (for example, the sidelink resource 715-*c* and the sidelink resource 715-*d*, or the sidelink resource 715-*e* and the sidelink resource 715-*f*), or both. One sidelink resource in a pair of sidelink resources (for example, the sidelink resource 715-*a*) may be allocated for conveying an instruction to wake up, and the other sidelink resource in a pair of sidelink resources (for example, the sidelink resource 715-*b*) may be allocated for conveying an instruction to go to sleep, as described in greater detail with reference to FIG. 6. Such relationships between pairs of sidelink resources 715, L1 or L2 destination identifiers, and time or frequency offsets, may be configured at the UEUEs 115 or calculated by the UEUEs 115, as described in greater detail with reference to FIG. 6.

Figure 8:
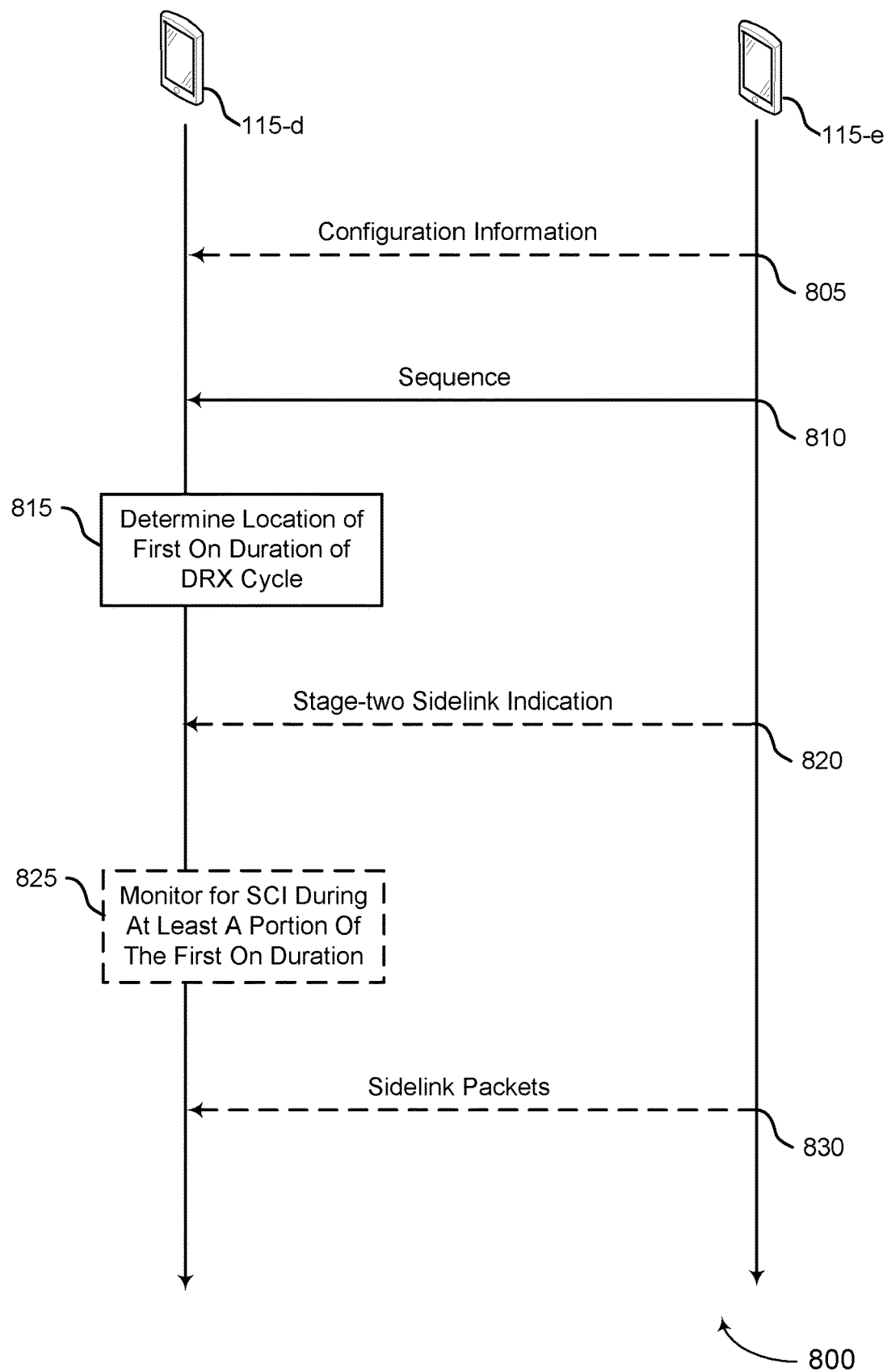
FIG. 8 illustrates an example of a process flow that supports wake-up or go-to-sleep signaling for multiple sidelink discontinuous reception cycles in accordance with aspects of the present disclosure.

FIG. 8 illustrates an example of a process flow 800 that supports wake-up or go-to-sleep signaling for multiple sidelink discontinuous reception cycles in accordance with aspects of the present disclosure. Process flow 800 may include one or more wireless devices, such as the UE 115-*d* which may be an example of a receiving UE and the UE 115-*e* which may be an example of a transmitting UE, which may be examples of corresponding devices described with reference to FIGS. 1-7.

At 810, the UE 115-*e* may transmit, and the UE 115-*d* may receive, a sidelink indication signal including a sequence. The sequence may be a ZC sequence. The sequence may indicate to the UE 115-*d* to change an active status during a sidelink DRX cycle.

In some examples, the sequence indicating to the UE 115-*d* to change an active status may indicate to the UE 115-*d* to wake up (for example, as described in greater detail with reference to FIGS. 3-5). In such examples, in examples in which the UE 115-*e* has one or more sidelink packets for transmission to the UE 115-*d* during the first on duration, then the UE 115-*e* may transmit the sequence to the UE 115-*d* at 810. In examples in which the UE 115-*e* does not have any sidelink packets to transmit to the UE 115-*d*, then the UE 115-*e* may refrain om transmitting the sequence at 810. The UE 115-*d* may monitor for the sequence at 810, determine that the UE 115-*e* did not transmit the sequence, and may perform the DRX procedure by refraining from waking up during one or more on durations.

The sequence indicating to the UE 115-*d* to change an active status for the UE 115-*d* may be a first instruction for the UE 115-*d* to wake up, or may be a second instruction for the first UE to go to sleep, as described in greater detail with reference to FIGS. 6-7. The sequence itself may include a 1-bit indication. In examples in which the 1-bit indication value is set to "1", the sequence may indicate the first instruction (for example, to wake up), or in examples in which the 1-bit indication value is set to "0", the sequence may indicate the second instruction (for example, to go to sleep) for the on duration of a sidelink DRX cycle determined at 815. In some examples, the sequence may indicate whether to wake up or go to sleep based on the sidelink resource at which the UE 115-*e* transmits the sequence. For example, receiving the sequence at 810 at a first sidelink resource (for example, of a pair of sidelink resources associated with the first on duration) may indicate that the UE 115-*d* is to wake up during the first on duration, while receiving the sequence at 810 at a second sidelink resource (for example, of the pair of sidelink resources associated with the first on duration) may indicate that the UE 115-*d* is not to wake up during the first on duration.

At 815, the UE 115-*d* may determine a location of the first on duration of the first sidelink DRX cycle. For example, there may be multiple DRX cycles configured for the UE 115-*d* (for example, a sidelink DRX cycle for unicast sidelink communications, a sidelink DRX cycle for groupcast sidelink communications, a sidelink DRX cycle for broadcast sidelink communications, among other examples). Some on durations of the multiple sidelink DRX cycles may overlap (for example, may start at the same time). The UE 115-*d* may determine to which on duration of multiple on durations of multiple sidelink DRX cycles the indication to change an active status applies.

The UE 115-*d* may perform a DRX procedure during the first on duration determined at 815 based on the sequence indicating that the UE 115-*d* is to change its active status. For example, the UE 115-*d* may wake up during the first on duration, and may receive sidelink packets generated by and transmitted by the UE 115-*e*. In some examples, the UE 115-*d* may go to sleep for part or all of the first on duration based on receiving the sequence at 810.

In some examples, the UE 115-*d* may determine, at 815, the first on duration of the sidelink DRX cycle based on a mapping between the first sidelink resource on which the UE 115-*e* transmitted the sequence at 810, as described in greater detail with reference to FIGS. 3-4. For example, the UE 115-*e* may transmit, to the UE 115-*d*, the sequence on a first sidelink resource based on a destination identifier associated with the sidelink DRX cycle that includes the first on duration. In some examples, at 805 the UE 115-*e* may transmit configuration information to the UE 115-*d* including information about the mapping. In some examples, a base station 105 or another network entity or another UE may configure the UE 115-*d* and UE 115-*e* with the configuration information, or the mapping information may be standardized. The mapping may include a mapping between a set of sidelink resources, including the first sidelink resource, and respective destination identifiers associated with respective sidelink DRX cycles. In some examples, the UE 115-*d* may determine (for example, calculate) the first sidelink resource based on the destination identifier associated with the sidelink DRX cycle with the first on duration (for example, may determine a PRB index value for the first sidelink resource using an L1 or L2 destination identifier). Thus, the UE 115-*e* and any number of additional UEs 115-*e* may transmit identical sequences (indicating that the UE 115-*d* is to wake up for a subsequent on duration of a sidelink DRX cycle), but the UE 115-*e* may determine for which on duration to wake up based on the sidelink resource on which the sequences are transmitted, and the mapping information. In some examples, in examples in which the UE 115-*d* does not receive the sequence at 810, then the UE 115-*d* may refrain from waking up to receive sidelink packets at 830.

In some examples, the UE 115-*d* may receive the sequence (for example, and one or more additional sequences from one or more additional UEs 115) on a common sidelink resource (for example, the first sidelink resource). The sequence may indicate that the UE 115-*d* is to wake up. The UE 115-*d* may receive the sequence, along with any additional sequences, on the first sidelink resource. The UE 115-*d* determine, at 815, the first on duration of the sidelink DRX cycle based on a mapping between an initial value for the sequence and the destination identifier associated with the sidelink DRX cycle with the first on duration. The UE 115-*d* may receive the sequence on a single sidelink resource allocated for sidelink indication signals including sequences for indicating to UEs to change respective active statuses (for example, a common sidelink resource). The UE may determine the on duration based on a mapping between the initial value of the sequence detected at 810 and the destination identifier associated with the sidelink DRX cycle with the first on duration. In some examples, at 805, the UE 115-*d* may receive (for example, from the UE 115-*e*, a base station, another network entity, or another UE, among other examples), configuration information including the mapping. The mapping may include a mapping between a set of initial values, including the initial value, and respective destination identifiers associated with sidelink DRX cycles with at least the first on duration. In some examples, the UE 115-*d* may determine the on duration from the multiple on durations by determining (for example, calculating) the destination identifier that is associated with the sidelink DRX cycle with the first on duration based on the initial value detected from the sequence. Thus, although the UE 115-*d* may receive multiple sequences on a single, common sidelink resource, the UE 115-*d* may determine to which on duration the sequences apply based on the initial value detected from each sequence.

In some examples, the UE 115-*e* may transmit a two-stage sidelink indication instructing the UE 115-*d* to change an active status, as described in greater detail with reference to FIGS. 5 and 7. For example, at 810, the UE 115-*e* may transmit a first stage one indication signal, including the sequence. The first stage one indication signal may indicate to the first UE 115-*d* to wake up or to go to sleep. At 815820, the UE 115-*e* may transmit, and the UE 115-*d* may receive, a first stage two indication. The UE 115-*d* may receive the first stage two indication during a first portion of the first on duration. The first stage two indication may include at least one of a source identifier associated with the second UE, a destination identifier associated with the first on duration, a duration with a number of the first on duration or with a number of cycles of the discontinuous reception cycle during which to wake up or to go to sleep. In some examples, in examples in which the first stage two indication indicates that the UE 115-e is transmitting sidelink packets on the first on duration that are relevant to the UE 115-d, then the UE 115-d may wake up during at least a second portion of the first on duration based at least in part on receiving the stage two sidelink indication. For example, at 825, the UE 115-d may monitor for SCI during the first on duration. In examples in which the first stage two indication indicates that the UE 115-e is not transmitting sidelink packets on the first on duration that are relevant to the UE 115-d, then the UE 115-d may go back to sleep during at least a second portion of the first on duration based at least in part on receiving the stage two sidelink indication.

In some examples, the UE 115-d may receive at least a second sequence (for example, at 810) from a third UE 115, and may further receive a second stage two sidelink indication from the third UE during a first portion of a second on duration. The second stage two sidelink indication may include a destination identifier associated with the second on duration, a duration with a number of the second on durations or a number of cycles of the discontinuous reception cycle during which to wake up or to go to sleep. The UE 115-d may further determine whether to wake up or go to sleep for the duration of the second on duration based on the second stage two sidelink indication.

Figure 9:
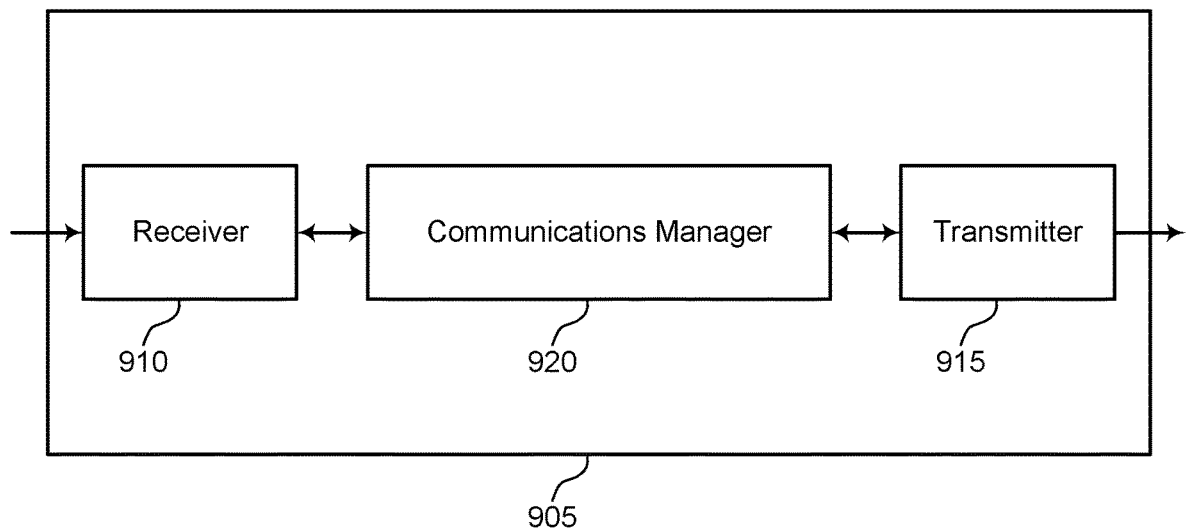
FIGS. 9 and 10 show block diagrams of devices that support wake-up or go-to-sleep signaling for multiple sidelink discontinuous reception cycles in accordance with aspects of the present disclosure.

FIG. 9 shows a block diagram of a device 905 that supports wake-up or go-to-sleep signaling for multiple sidelink discontinuous reception cycles in accordance with aspects of the present disclosure. The device 905 may be an example of aspects of a UE 115 as described herein. The device 905 may include a receiver 910, a transmitter 915, and a communications manager 920. The communications manager 920 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to wake-up or go-to-sleep signaling for multiple sidelink discontinuous reception cycles). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to wake-up or go-to-sleep signaling for multiple sidelink discontinuous reception cycles). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of wake-up or go-to-sleep signaling for multiple sidelink discontinuous reception cycles as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 920, the receiver 910, the transmitter 915, or various combinations or components thereof may be implemented in code (for example, as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 920 may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first UE in accordance with examples as disclosed herein. For example, the communications manager 920 may be configured as or otherwise support a means for receiving, from a second UE, a sidelink signal including a sequence indicating to the first UE to change an active status for at least a portion of a first on duration of a first discontinuous reception cycle of a plurality of discontinuous reception cycles, the first on duration at least partially overlapping in time with one or more other on durations of one or more other discontinuous reception cycles of the plurality of discontinuous reception cycles. The communications manager 920 may be configured as or otherwise support a means for determining, based on receiving the sidelink signal, a location of a first on duration of the discontinuous reception cycle of a set of multiple on durations of a set of multiple respective discontinuous reception cycles that at least partially overlap in time. The communications manager 920 may be configured as or otherwise support a means for performing a discontinuous reception procedure during the first on duration based on the sequence indicating to the first UE to change the active status.

Additionally, or alternatively, the communications manager 920 may support wireless communications at a second UE in accordance with examples as disclosed herein. For example, the communications manager 920 may be configured as or otherwise support a means for generating a sidelink signal including a sequence indicating to a first UE to change an active status during an on duration of a discontinuous reception cycle. The communications manager 920 may be configured as or otherwise support a means for transmitting the sidelink signal including the sequence to the first UE on a first sidelink resource. The communications manager 920 may be configured as or otherwise support a means for communicating with the first UE based on transmitting the sidelink signal including the sequence.

By including or configuring the communications manager 920 in accordance with examples as described herein, the device 905 (for example, a processor controlling or otherwise coupled to the receiver 910, the transmitter 915, the communications manager 920, or a combination thereof) may support techniques for sidelink DRX procedures resulting in reduced power consumption, efficient use of communication resources, improved reliability of sidelink signaling, improved battery life, and improved user experience.

Figure 10:
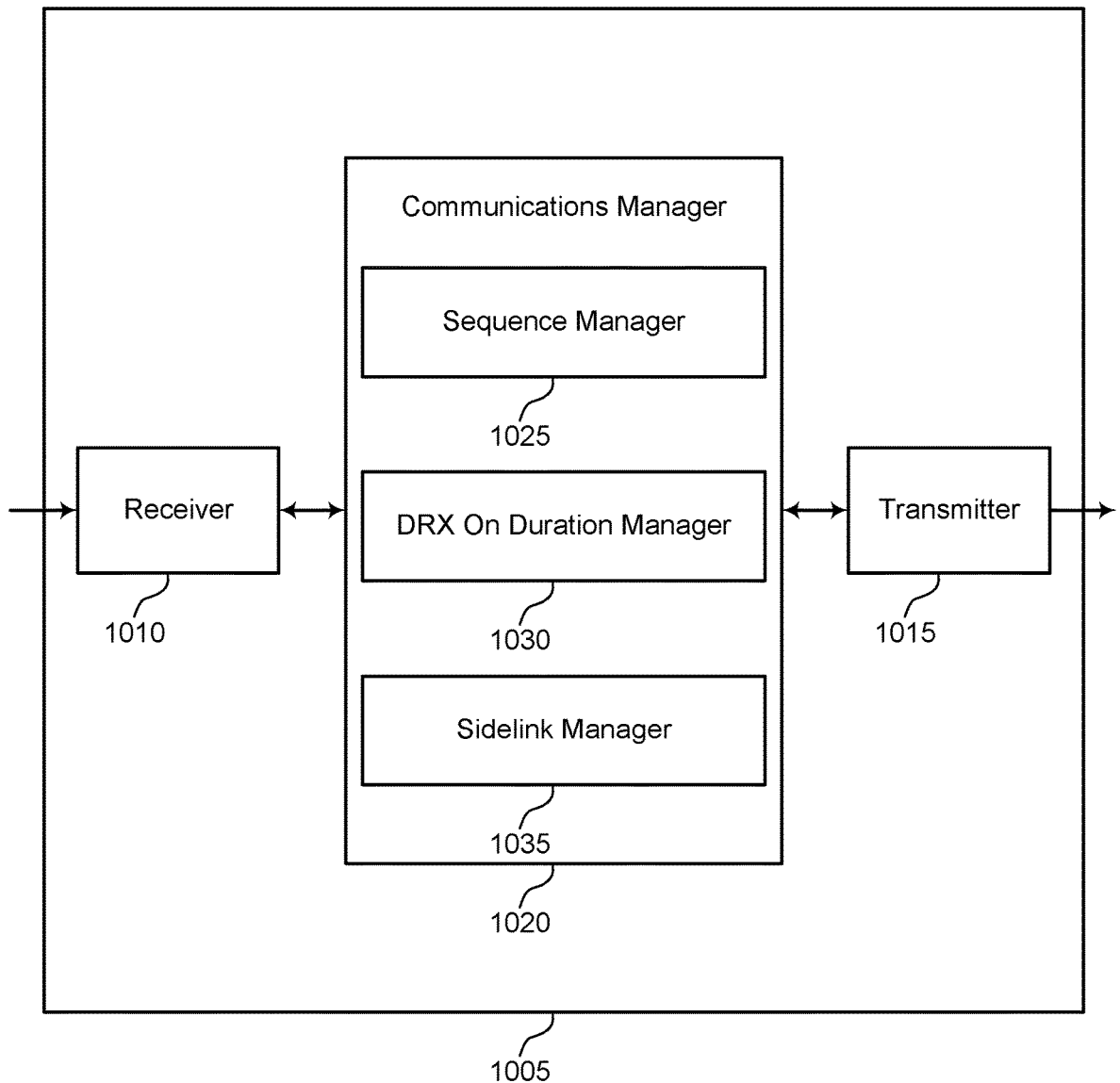

FIG. 10 shows a block diagram of a device 1005 that supports wake-up or go-to-sleep signaling for multiple sidelink discontinuous reception cycles in accordance with aspects of the present disclosure. The device 1005 may be an example of aspects of a device 905 or a UE 115 as described herein. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to wake-up or go-to-sleep signaling for multiple sidelink discontinuous reception cycles). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to wake-up or go-to-sleep signaling for multiple sidelink discontinuous reception cycles). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of wake-up or go-to-sleep signaling for multiple sidelink discontinuous reception cycles as described herein. For example, the communications manager 1020 may include a sequence manager 1025, a DRX on duration manager 1030, a sidelink manager 1035, or any combination thereof. In some examples, the communications manager 1020, or various components thereof, may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first UE in accordance with examples as disclosed herein. The sequence manager 1025 may be configured as or otherwise support a means for receiving, from a second UE, a sidelink signal including a sequence indicating to the first UE to change an active status for at least a portion of a first on duration of a first discontinuous reception cycle of a plurality of discontinuous reception cycles, the first on duration at least partially overlapping in time with one or more other on durations of one or more other discontinuous reception cycles of the plurality of discontinuous reception cycles. The DRX on duration manager 1030 may be configured as or otherwise support a means for determining, based on receiving the sidelink signal, a location of a first on duration of the discontinuous reception cycle of a set of multiple on durations of a set of multiple respective discontinuous reception cycles that at least partially overlap in time. The DRX on duration manager 1030 may be configured as or otherwise support a means for performing a discontinuous reception procedure during the first on duration based on the sequence indicating to the first UE to change the active status.

Additionally, or alternatively, the communications manager 1020 may support wireless communications at a second UE in accordance with examples as disclosed herein. The sequence manager 1025 may be configured as or otherwise support a means for generating a sidelink signal including a sequence indicating to a first UE to change an active status during an on duration of a discontinuous reception cycle. The sequence manager 1025 may be configured as or otherwise support a means for transmitting the sidelink signal including the sequence to the first UE on a first sidelink resource. The sidelink manager 1035 may be configured as or otherwise support a means for communicate with the first UE based on transmitting the sidelink signal including the sequence.

Figure 11:
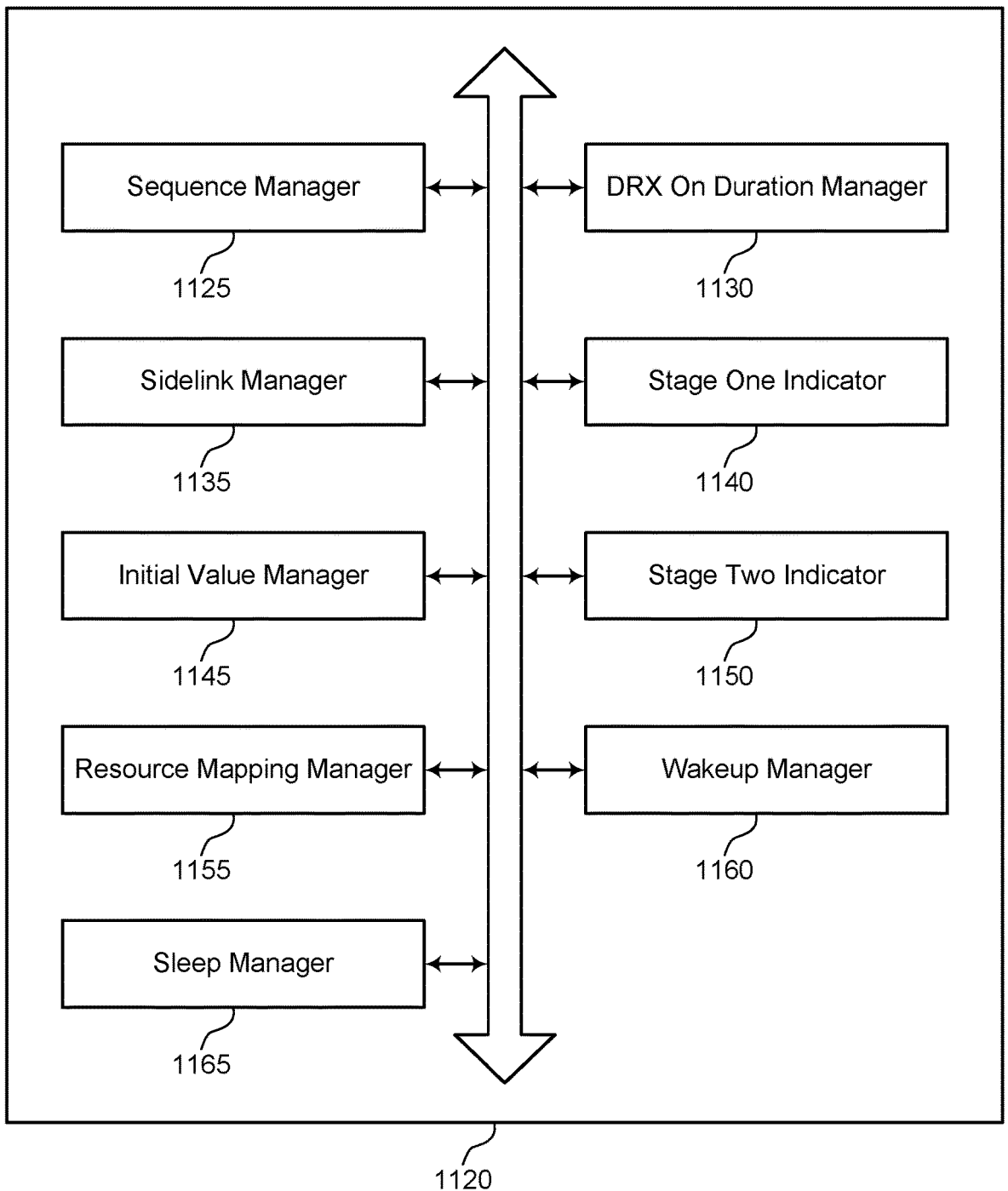
FIG. 11 shows a block diagram of a communications manager that supports wake-up or go-to-sleep signaling for multiple sidelink discontinuous reception cycles in accordance with aspects of the present disclosure.

FIG. 11 shows a block diagram of a communications manager 1120 that supports wake-up or go-to-sleep signaling for multiple sidelink discontinuous reception cycles in accordance with aspects of the present disclosure. The communications manager 1120, or various components thereof, may be an example of means for performing various aspects of wake-up or go-to-sleep signaling for multiple sidelink discontinuous reception cycles as described herein. For example, the communications manager 1120 may include a sequence manager 1125, a DRX on duration manager 1130, a sidelink manager 1135, a stage one indicator 1140, an initial value manager 1145, a stage two indicator 1150, a resource mapping manager 1155, a wakeup manager 1160, a sleep manager 1165, or any combination thereof. Each of these components may communicate, directly or indirectly, with one another (for example, via one or more buses).

The communications manager 1120 may support wireless communications at a first UE in accordance with examples as disclosed herein. The sequence manager 1125 may be configured as or otherwise support a means for receiving, from a second UE, a sidelink signal including a sequence indicating to the first UE to change an active status for at least a portion of a first on duration of a first discontinuous reception cycle of a plurality of discontinuous reception cycles, the first on duration at least partially overlapping in time with one or more other on durations of one or more other discontinuous reception cycles of the plurality of discontinuous reception cycles. The DRX on duration manager 1130 may be configured as or otherwise support a means for determining, based on receiving the sidelink signal, a location of a first on duration of the discontinuous reception cycle of a set of multiple on durations of a set of multiple respective discontinuous reception cycles that at least partially overlap in time. In some examples, the DRX on duration manager 1130 may be configured as or otherwise support a means for performing a discontinuous reception procedure during the first on duration based on the sequence indicating to the first UE to change the active status.

In some examples, determining the location of the first on duration is based on a mapping between a first sidelink resource on which the sequence is received and the first on duration.

In some examples, the resource mapping manager 1155 may be configured as or otherwise support a means for receiving, from the second UE or a base station, information including mapping information including a mapping between a set of sidelink resources, including the first sidelink resource, and respective destination identifiers associated with at least the first on duration.

In some examples, to support determining the location of the first on duration, the resource mapping manager 1155 may be configured as or otherwise support a means for determining, based on the mapping, a destination identifier associated with the first on duration based on a physical resource block index value associated with the first sidelink resource on which the sequence is received.

In some examples, determining the location of the first on duration is based on a mapping between an initial value included in the sequence and the first on duration. In some examples, the sequence is received at a single resource allocated for sidelink signals including sequences for indicating to UEs to change respective active statuses.

In some examples, the initial value manager 1145 may be configured as or otherwise support a means for receiving, from the second UE or a base station, information indicating the mapping, the information including a mapping between a set of initial values, including the initial value, and respective destination identifiers associated with at least the first on duration.

In some examples, the initial value manager 1145 may be configured as or otherwise support a means for determining a destination identifier associated with the first on duration based on the initial value of the sequence.

In some examples, to support sequence indicating to the first UE to change the active status, the sequence manager 1125 may be configured as or otherwise support a means for a first instruction for the first UE to wake up, where performing the discontinuous reception procedure during the first on duration includes waking up and monitoring for sidelink control information. In some examples, to support sequence indicating to the first UE to change the active status, the sequence manager 1125 may be configured as or otherwise support a means for a second instruction for the first UE to go to sleep, where performing the discontinuous reception procedure during the first on duration includes going to sleep and refraining from monitoring for sidelink control information. In some examples, the sequence includes a bit indicating the first instruction or the second instruction. In some examples, the sequence is received at a first time resource allocated for indicating the first instruction or at a second time resource allocated for indicating the second instruction, and where the first time resource is located with a fixed offset in time away from the second time resource.

In some examples, the sequence is received at a first frequency resource allocated for indicating the first instruction or at a second frequency resource allocated for indicating the second instruction, and where the first frequency resource is located with a fixed offset in frequency away from the second frequency resource. In some examples, the sidelink signal including the sequence includes a first stage one indication, and sequence indicating to the first UE to change the active status of the first UE includes an instruction to wake up or to go to sleep.

In some examples, the stage two indicator 1150 may be configured as or otherwise support a means for receiving, from the second UE during a first portion of the first on duration, a second sidelink signal including a first stage two indication, the first stage two indication including at least one of a source identifier associated with the second UE, a destination identifier associated with the first on duration, a duration of the first on duration, a number of cycles of the discontinuous reception cycle during which to wake up, or a number of cycles of the discontinuous reception cycle during which to go to sleep, a communication range associated with the first UE, or a location of the second UE.

In some examples, to support performing the discontinuous reception procedure, the wakeup manager 1160 may be configured as or otherwise support a means for waking up during at least a second portion of the first on duration based on receiving the second sidelink signal. In some examples, to support performing the discontinuous reception procedure, the wakeup manager 1160 may be configured as or otherwise support a means for monitoring sidelink control information from the first UE during the second portion of the first on duration.

In some examples, to support performing the discontinuous reception procedure, the sleep manager 1165 may be configured as or otherwise support a means for going to sleep during at least a second portion of the first on duration based on receiving the second sidelink signal.

In some examples, the stage one indicator 1140 may be configured as or otherwise support a means for receiving, from a third UE, a third sidelink signal including a second sequence instructing the first UE to wake up during a second on duration of the set of multiple on durations, the second sequence including a second stage one indication. In some examples, the stage two indicator 1150 may be configured as or otherwise support a means for receiving, from the third UE during a first portion of the second on duration, a fourth sidelink signal including a second stage two indication, the second stage two indication including at least one of a source identifier associated with the third UE, a destination identifier associated with the second on duration, a duration of the second on duration, a number of cycles of the discontinuous reception cycle during which to wake up, or a number of cycles of the discontinuous reception cycle during which to go to sleep, a communication range associated with the first UE, or a location of the second UE.

Additionally, or alternatively, the communications manager 1120 may support wireless communications at a second UE in accordance with examples as disclosed herein. In some examples, the sequence manager 1125 may be configured as or otherwise support a means for generating a sidelink signal including a sequence indicating to a first UE to change an active status during an on duration of a discontinuous reception cycle. In some examples, the sequence manager 1125 may be configured as or otherwise support a means for transmitting the sidelink signal including the sequence to the first UE on a first sidelink resource. The sidelink manager 1135 may be configured as or otherwise support a means for communicate with the first UE based on transmitting the sidelink signal including the sequence. In some examples, the first sidelink resource on which the sequence is transmitted is associated with the first on duration.

In some examples, the resource mapping manager 1155 may be configured as or otherwise support a means for transmitting, to the first UE, information including a mapping between a set of sidelink resources, including the first sidelink resource, and respective destination identifiers associated with at least the first on duration.

In some examples, the initial value manager 1145 may be configured as or otherwise support a means for including, in the sequence, an initial value associated with the first on duration, where the initial value and the first on duration are associated with each other according to a mapping, and where the first sidelink resource is allocated for sidelink signals including sequences for indicating to UEs to change respective active statuses. In some examples, the initial value manager 1145 may be configured as or otherwise support a means for transmitting, to the first UE, information indicating the mapping, the information including a mapping between a set of initial values, including the initial value, and respective destination identifiers associated with at least the first on duration.

In some examples, to support sequence instructing the first UE to change the active status, the sequence manager 1125 may be configured as or otherwise support a means for a first instruction for the first UE to wake up, where communicating with the first UE includes transmitting sidelink control information to the first UE during the first on duration. In some examples, to support sequence instructing the first UE to change the active status, the sequence manager 1125 may be configured as or otherwise support a means for a second instruction for the first UE to go to sleep, where communicating with the first UE includes not performing sidelink communications with the first UE during the first on duration, and performing sidelink communications with the first UE after the first on duration.

In some examples, the sequence includes a bit indicating the first instruction or the second instruction. In some examples, the sequence is transmitted at a first time resource allocated for indicating the first instruction or at a second time resource allocated for indicating the second instruction, and where the first time resource is located with a fixed offset in time away from the second time resource. In some examples, the sequence is transmitted at a first frequency resource allocated for indicating the first instruction or at a second frequency resource allocated for indicating the second instruction, and where the first frequency resource is located with a fixed offset in frequency away from the second frequency resource.

In some examples, the stage two indicator 1150 may be configured as or otherwise support a means for transmitting, to the first UE during a first portion of the first on duration, a second sidelink signal including a first stage two indication, the first stage two indication including at least one of a source identifier associated with the second UE, a destination identifier associated with the first on duration, a duration of the first on duration, a number of cycles of the discontinuous reception cycle during which to wake up, or a number of cycles of the discontinuous reception cycle during which to go to sleep, a communication range associated with the first UE, or a location of the second UE.

Figure 12:
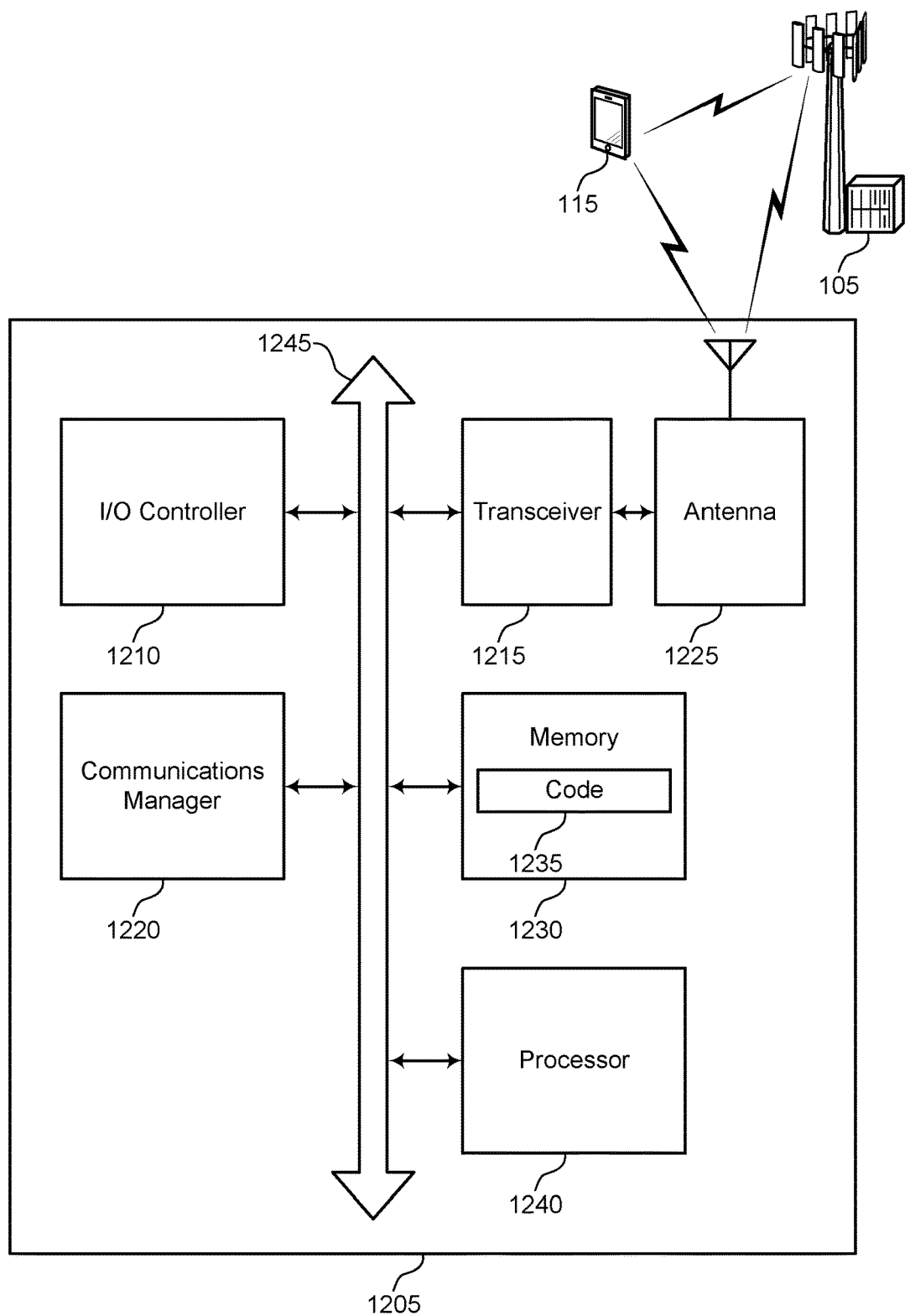
FIG. 12 shows a diagram of a system including a device that supports wake-up or go-to-sleep signaling for multiple sidelink discontinuous reception cycles in accordance with aspects of the present disclosure.

FIG. 12 shows a diagram of a system including a device 1205 that supports wake-up or go-to-sleep signaling for multiple sidelink discontinuous reception cycles in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (for example, operatively, communicatively, functionally, electronically, electrically) via one or more buses (for example, a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (for example, when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (for example, the memory 1230) to cause the device 1205 to perform various functions (for example, functions or tasks supporting wake-up or go-to-sleep signaling for multiple sidelink discontinuous reception cycles). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a first UE in accordance with examples as disclosed herein. For example, the communications manager 1220 may be configured as or otherwise support a means for receiving, from a second UE, a sidelink signal including a sequence indicating to the first UE to change an active status for at least a portion of a first on duration of a first discontinuous reception cycle of a plurality of discontinuous reception cycles, the first on duration at least partially overlapping in time with one or more other on durations of one or more other discontinuous reception cycles of the plurality of discontinuous reception cycles. The communications manager 1220 may be configured as or otherwise support a means for determining, based on receiving the sidelink signal, a location of a first on duration of the discontinuous reception cycle of a set of multiple on durations of a set of multiple respective discontinuous reception cycles that at least partially overlap in time. The communications manager 1220 may be configured as or otherwise support a means for performing a discontinuous reception procedure during the first on duration based on the sequence indicating to the first UE to change the active status.

Additionally, or alternatively, the communications manager 1220 may support wireless communications at a second UE in accordance with examples as disclosed herein. For example, the communications manager 1220 may be configured as or otherwise support a means for generating a sidelink signal including a sequence indicating to a first UE to change an active status during an on duration of a discontinuous reception cycle. The communications manager 1220 may be configured as or otherwise support a means for transmitting the sidelink signal including the sequence to the first UE on a first sidelink resource. The communications manager 1220 may be configured as or otherwise support a means for communicating with the first UE based on transmitting the sidelink signal including the sequence.

By including or configuring the communications manager 1220 in accordance with examples as described herein, the device 1205 may support techniques for sidelink DRX procedures resulting in reduced power consumption, efficient use of communication resources, improved reliability of sidelink signaling, improved battery life, and improved user experience.

In some examples, the communications manager 1220 may be configured to perform various operations (for example, receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of wake-up or go-to-sleep signaling for multiple sidelink discontinuous reception cycles as described herein, or the processor 1240 and the memory 1230 may be otherwise configured to perform or support such operations.

Figure 13:
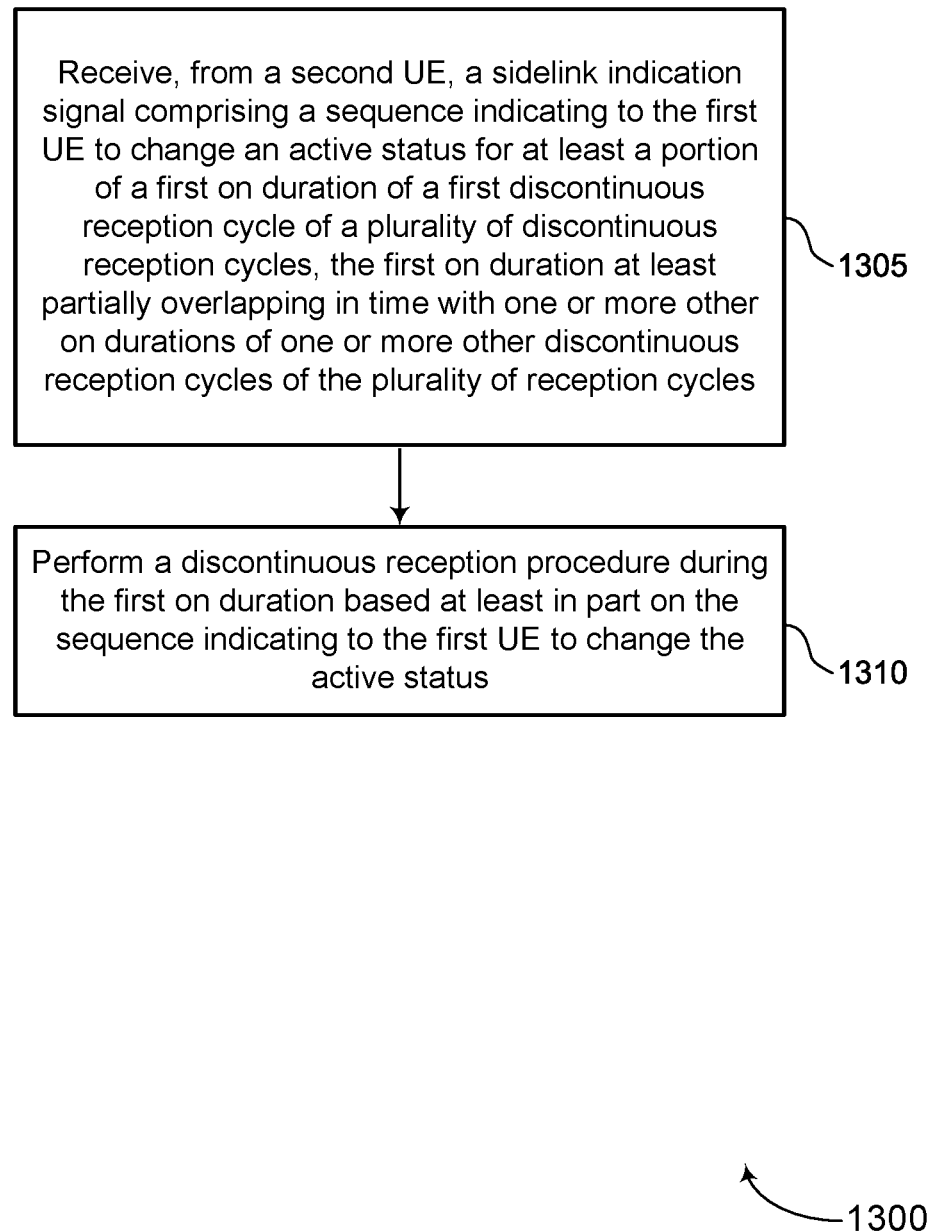
FIGS. 13-16 show flowcharts illustrating methods that support wake-up or go-to-sleep signaling for multiple sidelink discontinuous reception cycles in accordance with aspects of the present disclosure.

FIG. 13 shows a flowchart illustrating a method 1300 that supports wake-up or go-to-sleep signaling for multiple sidelink discontinuous reception cycles in accordance with aspects of the present disclosure. The operations of the method 1300 may be implemented by a UE or its components as described herein. For example, the operations of the method 1300 may be performed by a UE 115 as described with reference to FIGS. 1-12. In some examples, a UE may execute a set of instructions to control the functional elements of the UE to perform the described functions. Additionally, or alternatively, the UE may perform aspects of the described functions using special-purpose hardware.

At 1305, the method may include receiving, from a second UE, a sidelink signal including a sequence indicating to the first UE to change an active status for at least a portion of a first on duration of a first discontinuous reception cycle of a plurality of discontinuous reception cycles, the first on duration at least partially overlapping in time with one or more other on durations of one or more other discontinuous reception cycles of the plurality of reception cycles. The operations of 1305 may be performed in accordance with examples as disclosed herein. In some examples, aspects of the operations of 1305 may be performed by a sequence manager 1125 as described with reference to FIG. 11.

At 1310, the method may include performing a discontinuous reception procedure during the first on duration based on the sequence indicating to the first UE to change the active status. The operations of 1315 may be performed in accordance with examples as disclosed herein. In some examples, aspects of the operations of 1315 may be performed by a DRX on duration manager 1130 as described with reference to FIG. 11.

Figure 14:
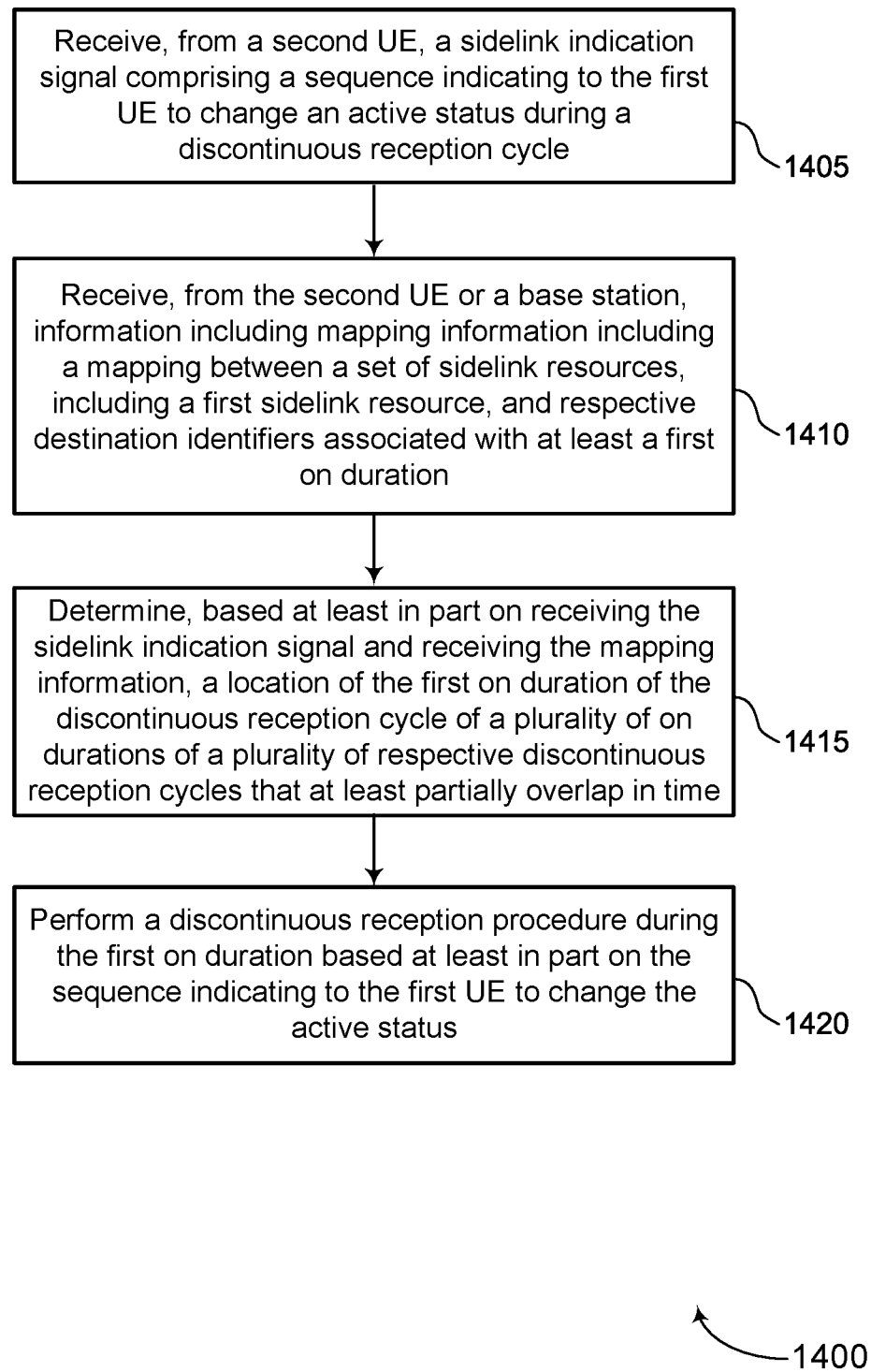

FIG. 14 shows a flowchart illustrating a method 1400 that supports wake-up or go-to-sleep signaling for multiple sidelink discontinuous reception cycles in accordance with aspects of the present disclosure. The operations of the method 1400 may be implemented by a UE or its components as described herein. For example, the operations of the method 1400 may be performed by a UE 115 as described with reference to FIGS. 1-12. In some examples, a UE may execute a set of instructions to control the functional elements of the UE to perform the described functions. Additionally, or alternatively, the UE may perform aspects of the described functions using special-purpose hardware.

At 1405, the method may include receiving, from a second UE, a sidelink signal including a sequence indicating to the first UE to change an active status during a discontinuous reception cycle. The operations of 1405 may be performed in accordance with examples as disclosed herein. In some examples, aspects of the operations of 1405 may be performed by a sequence manager 1125 as described with reference to FIG. 11.

At 1410, the method may include receiving, from the second UE or a base station, information including mapping information including a mapping between a set of sidelink resources, including a first sidelink resource, and respective destination identifiers associated with at least a first on duration. The operations of 1410 may be performed in accordance with examples as disclosed herein. In some examples, aspects of the operations of 1410 may be performed by a resource mapping manager 1155 as described with reference to FIG. 11.

At 1415, the method may include determining, based at least in part on receiving the sidelink signal and receiving the mapping information, a location of the first on duration of the discontinuous reception cycle of a plurality of on durations of a plurality of respective discontinuous reception cycles that at least partially overlap in time. The operations of 1415 may be performed in accordance with examples as disclosed herein. In some examples, aspects of the operations of 1415 may be performed by a DRX on duration manager 1130 as described with reference to FIG. 11.

At 1420, the method may include performing a discontinuous reception procedure during the first on duration based on the sequence indicating to the first UE to change the active status. The operations of 1420 may be performed in accordance with examples as disclosed herein. In some examples, aspects of the operations of 1420 may be performed by a DRX on duration manager 1130 as described with reference to FIG. 11.

Figure 15:
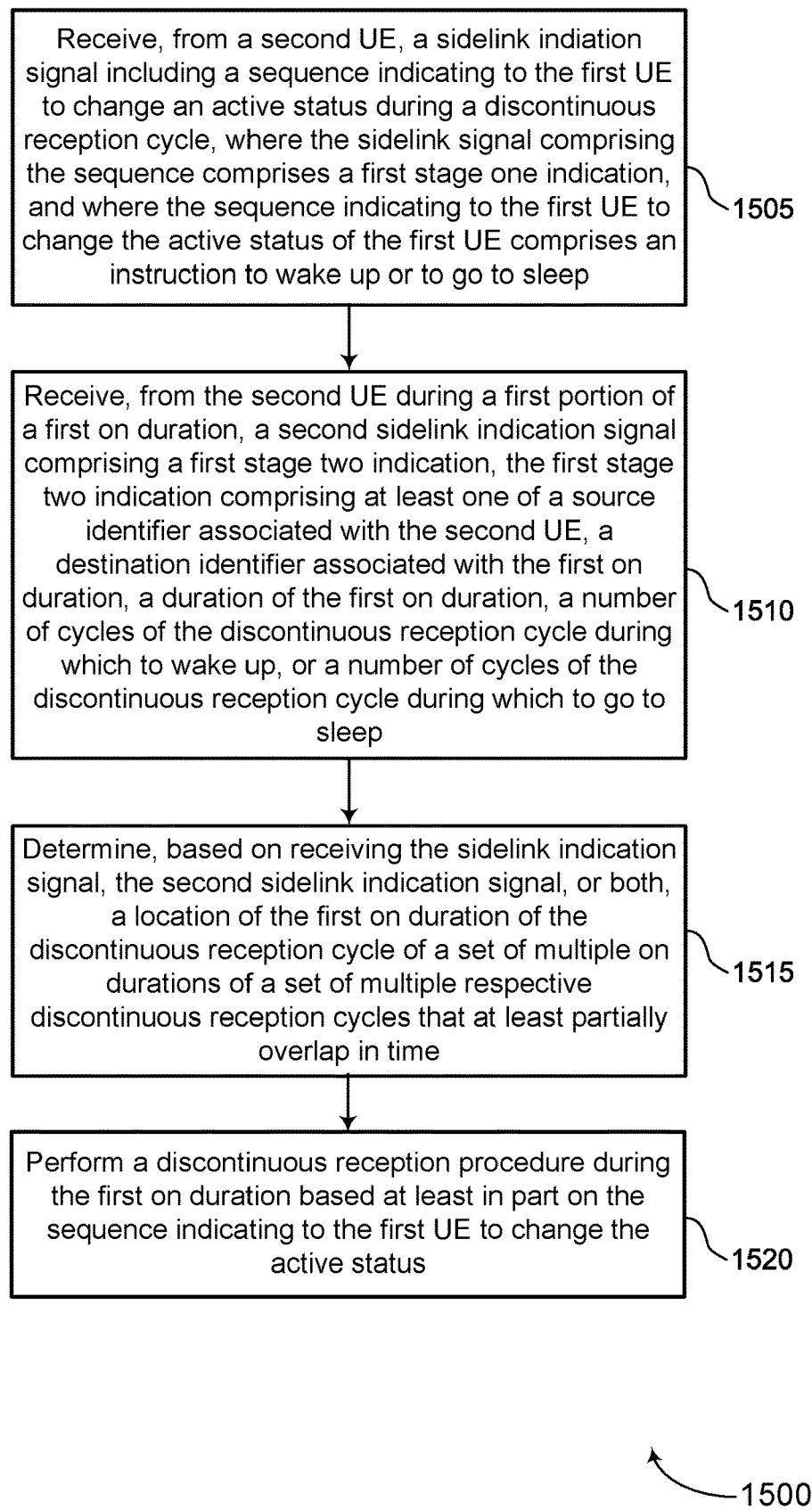

FIG. 15 shows a flowchart illustrating a method 1500 that supports wake-up or go-to-sleep signaling for multiple sidelink discontinuous reception cycles in accordance with aspects of the present disclosure. The operations of the method 1500 may be implemented by a UE or its components as described herein. For example, the operations of the method 1500 may be performed by a UE 115 as described with reference to FIGS. 1-12. In some examples, a UE may execute a set of instructions to control the functional elements of the UE to perform the described functions. Additionally, or alternatively, the UE may perform aspects of the described functions using special-purpose hardware.

At 1505, the method may include receiving, from a second UE, a sidelink signal including a sequence indicating to the first UE to change an active status during a discontinuous reception cycle, where the sidelink signal comprising the sequence comprises a first stage one indication, and where the sequence indicating to the first UE to change the active status of the first UE comprises an instruction to wake up or to go to sleep. The operations of 1505 may be performed in accordance with examples as disclosed herein. In some examples, aspects of the operations of 1505 may be performed by a sequence manager 1125 as described with reference to FIG. 11.

At 1510, the method may include receiving, from the second UE during a first portion of a first on duration, a second sidelink signal including a first stage two indication, the first stage two indication including at least one of a source identifier associated with the second UE, a destination identifier associated with a first on duration, a duration of the first on duration, a number of cycles of the discontinuous reception cycle during which to wake up, or a number of cycles of the discontinuous reception cycle during which to go to sleep, a communication range associated with the first UE, or a location of the second UE. The operations of 1510 may be performed in accordance with examples as disclosed herein. In some examples, aspects of the operations of 1510 may be performed by a stage two indicator 1150 as described with reference to FIG. 11.

At 1515, the method may include determining, based on receiving the sidelink signal, the second sidelink signal, or both, a location of the first on duration of the discontinuous reception cycle of a set of multiple on durations of a set of multiple respective discontinuous reception cycles that at least partially overlap in time. The operations of 1515 may be performed in accordance with examples as disclosed herein. In some examples, aspects of the operations of 1515 may be performed by a DRX on duration manager 1130 as described with reference to FIG. 11.

At 1520, the method may include performing a discontinuous reception procedure during the first on duration based on the sequence indicating to the first UE to change the active status. The operations of 1520 may be performed in accordance with examples as disclosed herein. In some examples, aspects of the operations of 1520 may be performed by a DRX on duration manager 1130 as described with reference to FIG. 11.

Figure 16:
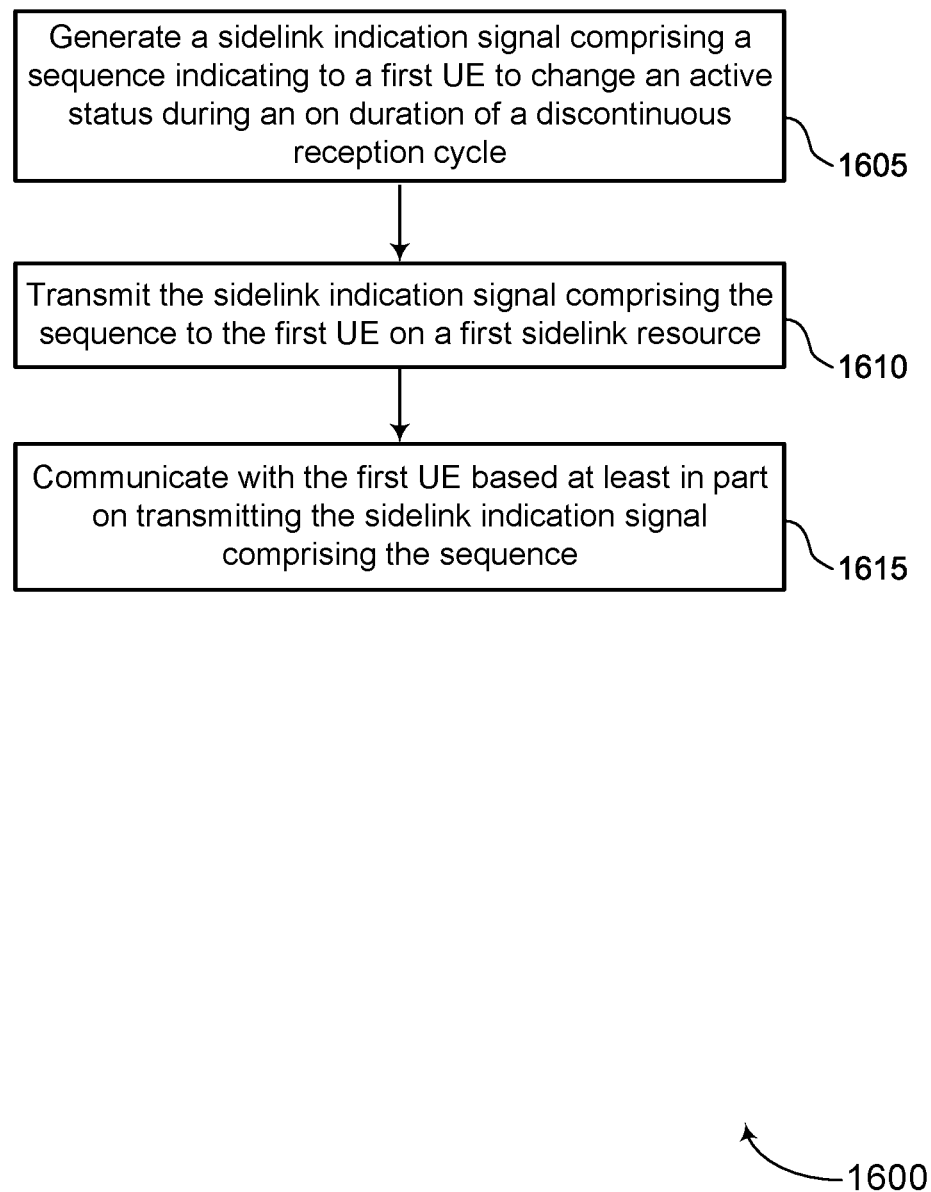

FIG. 16 shows a flowchart illustrating a method 1600 that supports wake-up or go-to-sleep signaling for multiple sidelink discontinuous reception cycles in accordance with aspects of the present disclosure. The operations of the method 1600 may be implemented by a UE or its components as described herein. For example, the operations of the method 1600 may be performed by a UE 115 as described with reference to FIGS. 1-12. In some examples, a UE may execute a set of instructions to control the functional elements of the UE to perform the described functions. Additionally, or alternatively, the UE may perform aspects of the described functions using special-purpose hardware.

At 1605, the method may include generating a sidelink signal including a sequence indicating to a first UE to change an active status during an on duration of a discontinuous reception cycle. The operations of 1605 may be performed in accordance with examples as disclosed herein. In some examples, aspects of the operations of 1605 may be performed by a sequence manager 1125 as described with reference to FIG. 11.

At 1610, the method may include transmitting the sidelink signal including the sequence to the first UE on a first sidelink resource. The operations of 1610 may be performed in accordance with examples as disclosed herein. In some examples, aspects of the operations of 1610 may be performed by a sequence manager 1125 as described with reference to FIG. 11.

At 1615, the method may include communicate with the first UE based on transmitting the sidelink signal including the sequence. The operations of 1615 may be performed in accordance with examples as disclosed herein. In some examples, aspects of the operations of 1615 may be performed by a sidelink manager 1135 as described with reference to FIG. 11.

The following provides an overview of aspects of the present disclosure:

Aspect 1: A method for wireless communications at a first UE, comprising: receiving, from a second UE, a sidelink signal comprising a sequence indicating to the first UE to change an active status for at least a portion of a first on duration of a first discontinuous reception cycle of a plurality of discontinuous reception cycles, the first on duration at least partially overlapping in time with one or more other on durations of one or more other discontinuous reception cycles of the plurality of discontinuous reception cycles; determining, based at least in part on receiving the sidelink indication signal, a location of the first on duration; and performing a discontinuous reception procedure during the first on duration based at least in part on the sequence indicating to the first UE to change the active status.

Aspect 2: The method of aspect 1, wherein determining the location of the first on duration is based at least in part on a mapping between a first sidelink resource on which the sequence is received and the first on duration.

Aspect 3: The method of aspect 2, further comprising: receiving, from the second UE or a base station, information including the mapping the information comprising a mapping between a set of sidelink resources, including the first sidelink resource, and respective destination identifiers associated with at least the first on duration.

Aspect 4: The method of any of aspects 2 through 3, wherein determining the location of the first on duration comprises: determining, based at least in part on the mapping, a destination identifier associated with the first on duration based at least in part on a physical resource block index value associated with the first sidelink resource on which the sequence is received.

Aspect 5: The method of any of aspects 1 through 4, wherein determining the location of the first on duration is based at least in part on a mapping between an initial value included in the sequence and the first on duration, the sequence is received at a single resource allocated for sidelink signals comprising sequences for indicating to UEs to change respective active statuses.

Aspect 6: The method of aspect 5, further comprising: receiving, from the second UE or a base station, information indicating the mapping, the information comprising a mapping between a set of initial values, including the initial value, and respective destination identifiers associated with at least the first on duration.

Aspect 7: The method of any of aspects 5 through 6, further comprising: determining a destination identifier associated with the first on duration based at least in part on the initial value of the sequence.

Aspect 8: The method of any of aspects 1 through 7, wherein the sequence indicating to the first UE to change the active status comprises: a first instruction for the first UE to wake up, wherein performing the discontinuous reception procedure during the first on duration comprises waking up and monitoring for sidelink control information; or a second instruction for the first UE to go to sleep, wherein performing the discontinuous reception procedure during the first on duration comprises going to sleep and refraining from monitoring for sidelink control information.

Aspect 9: The method of aspect 8, wherein the sequence comprises a bit indicating the first instruction or the second instruction.

Aspect 10: The method of any of aspects 8 through 9, wherein the sequence is received at a first time resource allocated for indicating the first instruction or at a second time resource allocated for indicating the second instruction, and wherein the first time resource is located with a fixed offset in time away from the second time resource.

Aspect 11: The method of any of aspects 8 through 10, wherein the sequence is received at a first frequency resource allocated for indicating the first instruction or at a second frequency resource allocated for indicating the second instruction, and wherein the first frequency resource is located with a fixed offset in frequency away from the second frequency resource.

Aspect 12: The method of any of aspects 1 through 11, wherein the sidelink signal comprising the sequence comprises a first stage one indication, and sequence indicating to the first UE to change the active status of the first UE comprises an instruction to wake up or to go to sleep.

Aspect 13: The method of aspect 12, further comprising: receiving, from the second UE during a first portion of the first on duration, a second sidelink signal comprising a first stage two indication, the first stage two indication comprising at least one of a source identifier associated with the second UE, a destination identifier associated with the first on duration, a duration of the first on duration, a number of cycles of the discontinuous reception cycle during which to wake up, or a number of cycles of the discontinuous reception cycle during which to go to sleep, a communication range associated with the first UE, or a location of the second UE.

Aspect 14: The method of aspect 13, wherein performing the discontinuous reception procedure comprises: waking up during at least a second portion of the first on duration based at least in part on receiving the second sidelink signal; and monitoring sidelink control information from the first UE during the second portion of the first on duration.

Aspect 15: The method of any of aspects 13 through 14, wherein performing the discontinuous reception procedure comprises: going to sleep during at least a second portion of the first on duration based at least in part on receiving the second sidelink signal.

Aspect 16: The method of any of aspects 13 through 15, further comprising: receiving, from a third UE, a third sidelink signal comprising a second sequence instructing the first UE to wake up during a second on duration of the one or more other on durations, the second sequence comprising a second stage one indication; and receiving, from the third UE during a first portion of the second on duration, a fourth sidelink signal comprising a second stage two indication, the second stage two indication comprising at least one of a source identifier associated with the third UE, a destination identifier associated with the second on duration, a duration of the second on duration, a number of cycles of the discontinuous reception cycle during which to wake up, or a number of cycles of the discontinuous reception cycle during which to go to sleep, a communication range associated with the first UE, or a location of the second UE.

Aspect 17: A method for wireless communications at a second UE, comprising: generating a sidelink signal comprising a sequence indicating to a first UE to change an active status during an on duration of a discontinuous reception cycle; transmitting the sidelink signal comprising the sequence to the first UE on a first sidelink resource; and communicate with the first UE based at least in part on transmitting the sidelink signal comprising the sequence.

Aspect 18: The method of aspect 17, wherein the first sidelink resource on which the sequence is transmitted is associated with the first on duration.

Aspect 19: The method of aspect 18, further comprising: transmitting, to the first UE, information including a mapping between a set of sidelink resources, including the first sidelink resource, and respective destination identifiers associated with at least the first on duration.

Aspect 20: The method of any of aspects 17 through 19, further comprising: including, in the sequence, an initial value associated with the first on duration, wherein the initial value and the first on duration are associated with each other according to a mapping, and wherein the first sidelink resource is allocated for sidelink signals comprising sequences for indicating to UEs to change respective active statuses.

Aspect 21: The method of aspect 20, further comprising: transmitting, to the first UE, information indicating the mapping, the information comprising a mapping between a set of initial values, including the initial value, and respective destination identifiers associated with at least the first on duration.

Aspect 22: The method of any of aspects 17 through 21, wherein the sequence instructing the first UE to change the active status comprises: a first instruction for the first UE to wake up, wherein communicating with the first UE comprises transmitting sidelink control information to the first UE during the first on duration; or a second instruction for the first UE to go to sleep, wherein communicating with the first UE comprises not performing sidelink communications with the first UE during the first on duration.

Aspect 23: The method of aspect 22, wherein the sequence comprises a bit indicating the first instruction or the second instruction.

Aspect 24: The method of any of aspects 22 through 23, wherein the sequence is transmitted at a first time resource allocated for indicating the first instruction or at a second time resource allocated for indicating the second instruction, and wherein the first time resource is located with a fixed offset in time away from the second time resource.

Aspect 25: The method of any of aspects 22 through 24, wherein the sequence is transmitted at a first frequency resource allocated for indicating the first instruction or at a second frequency resource allocated for indicating the second instruction, and wherein the first frequency resource is located with a fixed offset in frequency away from the second frequency resource.

Aspect 26: The method of any of aspects 17 through 25, further comprising: transmitting, to the first UE during a first portion of the first on duration, a second sidelink signal comprising a first stage two indication, the first stage two indication comprising at least one of a source identifier associated with the second UE, a destination identifier associated with the first on duration, a duration of the first on duration, a number of cycles of the discontinuous reception cycle during which to wake up, or a number of cycles of the discontinuous reception cycle during which to go to sleep, a communication range associated with the first UE, or a location of the second UE.

Aspect 27: An apparatus for wireless communications at a first UE, comprising a processor; memory coupled with the processor; and instructions stored in the memory and executable by the processor to cause the apparatus to perform a method of any of aspects 1 through 16.

Aspect 28: An apparatus for wireless communications at a first UE, comprising at least one means for performing a method of any of aspects 1 through 16.

Aspect 29: A non-transitory computer-readable medium storing code for wireless communications at a first UE, the code comprising instructions executable by a processor to perform a method of any of aspects 1 through 16.

Aspect 30: An apparatus for wireless communications at a second UE, comprising a processor; memory coupled with the processor; and instructions stored in the memory and executable by the processor to cause the apparatus to perform a method of any of aspects 17 through 26.

Aspect 31: An apparatus for wireless communications at a second UE, comprising at least one means for performing a method of any of aspects 17 through 26.

Aspect 32: A non-transitory computer-readable medium storing code for wireless communications at a second UE, the code comprising instructions executable by a processor to perform a method of any of aspects 17 through 26. It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    receiving mapping information corresponding to a respective identifier associated with a first on duration of a first discontinuous reception cycle of a plurality of discontinuous reception cycles, the mapping information indicating information associated with the first on duration;
    receiving, from a second UE, a sidelink indication signal comprising a sequence indicating to the first UE whether to change an active status by waking up or by going to sleep for at least a portion of the first on duration of the first discontinuous reception cycle of the plurality of discontinuous reception cycles, the first on duration at least partially overlapping in time with one or more other on durations of one or more other discontinuous reception cycles of the plurality of discontinuous reception cycles, wherein each of the one or more other discontinuous reception cycles of the plurality of discontinuous reception cycles corresponds to a respective UE of a plurality of UEs comprising the second UE; and
    performing a discontinuous reception procedure during the first on duration based at least in part on the sequence indicating to the first UE to change the active status and on receiving the mapping information.

2. The method of claim 1, further comprising determining, based at least in part on receiving the sidelink indication signal and on receiving the mapping information, a location of the first on duration.

3. The method of claim 2, wherein determining the location of the first on duration is based at least in part on the mapping information comprising a mapping between a first sidelink resource on which the sequence is received and the first on duration.

4. The method of claim 3, wherein the mapping information comprises a mapping between a set of sidelink resources, including the first sidelink resource, and respective destination identifiers associated with at least the first on duration, wherein the respective identifier associated with the first on duration is associated with the respective destination identifiers.

5. The method of claim 2, wherein determining the location of the first on duration comprises determining, based at least in part on the mapping information, a destination identifier associated with the first on duration based at least in part on a physical resource block index value associated with a first sidelink resource on which the sequence is received, wherein the respective identifier associated with the first on duration is the destination identifier.

6. The method of claim 2, wherein determining the location of the first on duration is based at least in part on the mapping information indicating a mapping between an initial value included in the sequence and the first on duration, and wherein the sequence is received at a single resource allocated for sidelink indication signals comprising sequences for indicating to UEs to change respective active statuses.

7. The method of claim 6, wherein the mapping information comprises a mapping between a set of initial values, including the initial value, and respective destination identifiers associated with at least the first on duration, wherein the respective identifier associated with the first on duration is associated with the respective destination identifiers.

8. The method of claim 6, further comprising determining a destination identifier associated with the first on duration based at least in part on the initial value of the sequence, wherein the respective identifier associated with the first on duration is the destination identifier.

9. The method of claim 1, wherein the sequence indicating to the first UE whether to change the active status by waking up or going to sleep comprises:
   a first instruction for the first UE to wake up, wherein performing the discontinuous reception procedure during the first on duration comprises waking up and monitoring for sidelink control information; or
   a second instruction for the first UE to go to sleep, wherein performing the discontinuous reception procedure during the first on duration comprises going to sleep and refraining from monitoring for the sidelink control information.

10. The method of claim 9, wherein the sequence comprises a bit indicating the first instruction or the second instruction.

11. The method of claim 9, wherein the sequence is received at a first time resource allocated for indicating the first instruction or at a second time resource allocated for indicating the second instruction, and wherein the first time resource is located with a fixed offset in time away from the second time resource.

12. The method of claim 9, wherein the sequence is received at a first frequency resource allocated for indicating the first instruction or at a second frequency resource allocated for indicating the second instruction, and wherein the first frequency resource is located with a fixed offset in frequency away from the second frequency resource.

13. A method for wireless communications at a first user equipment (UE), comprising:
   receiving, from a second UE, a sidelink indication signal comprising a sequence indicating to the first UE whether to change an active status by waking up or by going to sleep for at least a portion of a first on duration of a first discontinuous reception cycle of a plurality of discontinuous reception cycles, the first on duration at least partially overlapping in time with one or more other on durations of one or more other discontinuous reception cycles of the plurality of discontinuous reception cycles, wherein each of the one or more other discontinuous reception cycles of the plurality of discontinuous reception cycles corresponds to a respective UE of a plurality of UEs comprising the second UE, and wherein the sidelink indication signal comprising the sequence comprises a first stage one indication, the sequence indicating to the first UE to change the active status of the first UE comprises an instruction to wake up or to go to sleep;
   performing a discontinuous reception procedure during the first on duration based at least in part on the sequence indicating to the first UE to change the active status; and
   receiving, from the second UE during a first portion of the first on duration, a second sidelink indication signal comprising a first stage two indication, wherein performing the discontinuous reception procedure comprises waking up during at least a second portion of the first on duration based at least in part on receiving the second sidelink indication signal and monitoring sidelink control information from the first UE during the second portion of the first on duration or going to sleep during at least a second portion of the first on duration based at least in part on receiving the second sidelink indication signal.

14. The method of claim 13, wherein the first stage two indication comprising comprises at least one of a source identifier associated with the second UE, a destination identifier associated with the first on duration, a duration of the first on duration, a number of cycles of the discontinuous reception cycle during which to wake up, a number of cycles of the discontinuous reception cycle during which to go to sleep, a communication range associated with the first UE, or a location of the second UE.

15. The method of claim 14, further comprising:
   receiving, from a third UE, a third sidelink indication signal comprising a second sequence instructing the first UE to wake up during a second on duration of the one or more other on durations, the second sequence comprising a second stage one indication; and
   receiving, from the third UE during a first portion of the second on duration, a fourth sidelink indication signal comprising a second stage two indication, the second stage two indication comprising at least one of a source identifier associated with the third UE, a destination identifier associated with the second on duration, a duration of the second on duration, a number of cycles of the first discontinuous reception cycle during which to wake up, a number of cycles of the first discontinuous reception cycle during which to go to sleep, a communication range associated with the first UE, or a location of the second UE.

16. A method for wireless communications at a second UE, comprising:
   generating a sidelink indication signal comprising a sequence indicating to a first UE whether to change an active status by waking up or by going to sleep during a first on duration of a first discontinuous reception cycle of a plurality of discontinuous reception cycles corresponding to respective UEs of a plurality of UEs comprising the second UE;
   transmitting mapping information corresponding to a respective identifier associated with the first on duration of the first discontinuous reception cycle of the plurality of discontinuous reception cycles, the mapping information indicating information associated with the first on duration;
   transmitting the sidelink indication signal comprising the sequence to the first UE on a first sidelink resource; and
   communicate with the first UE based at least in part on transmitting the sidelink indication signal comprising the sequence and on transmitting the mapping information.

17. The method of claim 16, wherein the first sidelink resource on which the sequence is transmitted is associated with the first on duration.

18. The method of claim 17, wherein the mapping information comprises a mapping between a set of sidelink resources, including the first sidelink resource, and respective destination identifiers associated with at least the first on duration, wherein the respective identifier associated with the first on duration is associated with the respective destination identifiers.

19. The method of claim 16, further comprising including, in the sequence, an initial value associated with the first on duration, wherein the initial value and the first on duration are associated with each other according to a mapping indicated in the transmitted mapping information, and wherein the first sidelink resource is allocated for sidelink indication signals comprising sequences for indicating to UEs to change respective active statuses.

20. The method of claim 19, wherein the mapping information comprises a mapping between a set of initial values, including the initial value, and respective destination identifiers associated with at least the first on duration, wherein the respective identifier associated with the first on duration is associated with the respective destination identifiers.

21. The method of claim 16, wherein the sequence indicating to the first UE whether to change the active status by waking up or by going to sleep comprises:
a first instruction for the first UE to wake up, wherein communicating with the first UE comprises transmitting sidelink control information to the first UE during the first on duration; or
a second instruction for the first UE to go to sleep, wherein communicating with the first UE comprises not performing sidelink communications with the first UE during the first on duration, and performing sidelink communications with the first UE after the first on duration.

22. The method of claim 21, wherein the sequence comprises a bit indicating the first instruction or the second instruction.

23. The method of claim 21, wherein the sequence is transmitted at a first time resource allocated for indicating the first instruction or at a second time resource allocated for indicating the second instruction, and wherein the first time resource is located with a fixed offset in time away from the second time resource.

24. The method of claim 21, wherein the sequence is transmitted at a first frequency resource allocated for indicating the first instruction or at a second frequency resource allocated for indicating the second instruction, and wherein the first frequency resource is located with a fixed offset in frequency away from the second frequency resource.

25. The method of claim 16, further comprising transmitting, to the first UE during a first portion of the first on duration, a second sidelink indication signal comprising a first stage two indication, the first stage two indication comprising at least one of a source identifier associated with the second UE, a destination identifier associated with the first on duration, a duration of the first on duration, a number of cycles of the first discontinuous reception cycle during which to wake up, or a number of cycles of the first discontinuous reception cycle during which to go to sleep, a communication range associated with the first UE, or a location of the second UE.

26. An apparatus for wireless communications at a first user equipment (UE), comprising:
at least one processor; and
at least one memory coupled with the at least one processor and storing instructions executable by the at least one processor to cause the apparatus to:
receive mapping information corresponding to a respective identifier associated with a first on duration of a first discontinuous reception cycle of a plurality of discontinuous reception cycles, the mapping information indicating information associated with the first on duration;
receive, from a second UE, a sidelink indication signal comprising a sequence indicating to the first UE whether to change an active status by waking up or by going to sleep for at least a portion of the first on duration of the first discontinuous reception cycle of the plurality of discontinuous reception cycles, the first on duration at least partially overlapping in time with one or more other on durations of one or more other discontinuous reception cycles of the plurality of discontinuous reception cycles, wherein each of the one or more other discontinuous reception cycles of the plurality of discontinuous reception cycles corresponds to a respective UE of a plurality of UEs comprising the second UE; and
perform a discontinuous reception procedure during the first on duration based at least in part on the sequence indicating to the first UE to change the active status and on receiving the mapping information.

27. The apparatus of claim 26, wherein the instructions are further executable by the at least one processor to cause the apparatus to determine, based at least in part on receiving the sidelink indication signal and on receiving the mapping information, a location of the first on duration.

28. The apparatus of claim 26, wherein the sequence indicating to the first UE whether to change the active status by waking up or going to sleep comprises:
a first instruction for the first UE to wake up, wherein performing the discontinuous reception procedure during the first on duration comprises waking up and monitoring for sidelink control information; or
a second instruction for the first UE to go to sleep, wherein performing the discontinuous reception procedure during the first on duration comprises going to sleep and refraining from monitoring for the sidelink control information.

29. The apparatus of claim 28, wherein the sequence is received at a first time resource allocated for indicating the first instruction or at a second time resource allocated for indicating the second instruction, and wherein the first time resource is located with a fixed offset in time away from the second time resource.

30. The apparatus of claim 28, wherein the sequence is received at a first frequency resource allocated for indicating the first instruction or at a second frequency resource allocated for indicating the second instruction, and wherein the first frequency resource is located with a fixed offset in frequency away from the second frequency resource.

* * * * *